(12) United States Patent
Deng et al.

(10) Patent No.: US 8,537,901 B2
(45) Date of Patent: Sep. 17, 2013

(54) APPARATUS AND METHOD FOR EXOTIC CADENCE DETECTION

(75) Inventors: Xiaoyun Deng, Singapore (SG); Lucas Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 224 days.

(21) Appl. No.: 12/978,154

(22) Filed: Dec. 23, 2010

(65) Prior Publication Data

US 2012/0162439 A1    Jun. 28, 2012

(51) Int. Cl.
*H04B 1/66*    (2006.01)
(52) U.S. Cl.
USPC ................................. 375/240.26
(58) Field of Classification Search
None
See application file for complete search history.

(56) References Cited

U.S. PATENT DOCUMENTS

| | | | |
|---|---|---|---|
| 5,347,314 A | 9/1994 | Faroudja et al. | |
| 6,628,341 B1 | 9/2003 | Staley et al. | |
| 7,075,581 B1 | 7/2006 | Ozgen et al. | |
| 7,405,766 B1 | 7/2008 | Chou et al. | |
| 8,004,607 B2 | 8/2011 | Eymard et al. | |
| 2006/0171457 A1 | 8/2006 | DeGarrido et al. | |
| 2007/0188662 A1 | 8/2007 | Winger et al. | |
| 2007/0296858 A1 | 12/2007 | Eymard et al. | |
| 2007/0296870 A1 | 12/2007 | Foret | |
| 2008/0062308 A1* | 3/2008 | Zhai et al. | 348/448 |
| 2008/0106642 A1 | 5/2008 | Srinivasan et al. | |
| 2008/0151103 A1* | 6/2008 | Asamura et al. | 348/448 |
| 2008/0181517 A1 | 7/2008 | Aokage | |
| 2008/0278623 A1 | 11/2008 | Lu et al. | |
| 2009/0167938 A1 | 7/2009 | Matsuoka et al. | |
| 2009/0244370 A1 | 10/2009 | Tang | |
| 2009/0322940 A1 | 12/2009 | Kempf | |
| 2010/0254453 A1* | 10/2010 | Dane et al. | 375/240.12 |
| 2011/0019083 A1 | 1/2011 | Cordes et al. | |

* cited by examiner

*Primary Examiner* — Christopher S Kelley
*Assistant Examiner* — Zhen Jessica Li
(74) *Attorney, Agent, or Firm* — Hogan Lovells US LLP

(57) ABSTRACT

Aspects of the invention are directed towards an apparatus and method for detecting conventional and exotic cadences in video sequences. The cadence detector includes a motion auto-correlation unit using the inter-frame/field motion information to detect the cadence and a motion cross-correlation unit using the inter-frame/field motion information and the detected cadence to determine the cadence phase. The cadence detector also may include a reset signal generator to generate a reset signal to control the motion auto-correlation unit and the motion cross-correlation unit. The exotic cadence detector is robust and may support many cadences with reduced cadence detection latency as compared to the prior art.

27 Claims, 30 Drawing Sheets

| CADENCE | DESCRIPTION | LENGTH | INTER-FIELD MOTION PATTERN |
|---|---|---|---|
| 2:2 | "CONVENTIONAL" PULL-DOWN CONVERSION FROM 24p FILM TO 50i PAL SECAM | 2 | [10] |
| 3:2 | "CONVENTIONAL" PULL-DOWN CONVERSION FROM 24p FILM TO 60i NTSC | 5 | [10010] |
| 2:2:2:4 | 24p FILM TO 60i CONVERSION WITH EVERY FOURTH FRAME REPEATED SO THAT LESS PROCESSING IS REQUIRED. USED TO MAXIMIZE THE RECORDING TIME WHEN STORING PROGRESSIVE SOURCE AS 60i ON DVCAM CAMCORDERS. | 10 | [1010101000] |
| 2:3:3:2 | "ADVANCED PULL-DOWN" FOR 24p FILM TO 60i NTSC CONVERSION WITH ONLY ONE DIRTY FRAME IN EVERY FIVE. FIRST IMPLEMENTED IN PANASONIC AG-DVX100 CAMCORDERS. | 10 | [1010010010] |
| 5:5 | 24fps TO 120fps (5x FRAME REPETITION) PROGRESSIVE FRAME RATE CONVERSION TO DISPLAY 24fps VIDEO (e.g. FROM A DVD PLAYER) ON A PROGRESSIVE DISPLAY (e.g. LCD OR PLASMA) | 10 | [1000010000] |
| 6:4 | 24fps TO 120fps (3:2 PULL-DOWN FOLLOWED BY 2x DE-INTERLACING) PROGRESSIVE FRAME RATE CONVERSION | 10 | [1000001000] |
| 3:2:3:2:2 | VARI-SPEED BROADCASTS TO SQUEEZE AN EXTRA 30 SECOND COMMERCIAL INTO A 30 MINUTE SHOW | 10 | [1001010010] |
| 8:7 | USED FOR ANIMATED MATERIAL SUCH AS JAPANESE ANIME | 15 | [100000001000000] |
| 2:2:2:2:2:2:2:2:2:2:2:3 (TELECINE B) | PULL-DOWN CONVERSIOPN FROM 24fps FILM TO 25fps PAL OR SECAM BY INSERTING A PULL-DOWN FIELD EVERY 12 FRAMES SUCH THAT PLAYBACK SPEED IS UNCHANGED | 25 | [1010101010101010101010110] |

Fig. 9

APPARATUS AND METHOD FOR EXOTIC CADENCE DETECTION

BACKGROUND OF THE INVENTION

1. Field of the Invention

The invention generally relates to an apparatus and method for exotic cadence detection, and more particularly to a film mode detection method and system that is programmable for a plurality of cadences including conventional and exotic cadences in TV and Set-Top-Box products.

2. Discussion of the Related Art

Modern video displays, e.g., liquid crystal displays (LCD) and plasma displays, are not able to operate in an interlaced mode. Interlace is found throughout a number of broadcasting formats. Therefore de-interlacing circuitry is needed in set-to-box (STB)/TV to de-interlace video into progressive video that can be played on modern video displays.

Currently, there are a number of different source formats, e.g., video camera may be captured at 50 or 60 frames per second, film format may be captured at 24 or 25 frames per second, and various animations may be smaller, e.g., 8 frames per second. There are also a variety of different display formats, e.g., phase alternating line (PAL), primarily used in Europe, displays 50 fields per second, the national television standards committee, (NTSC) format, and various other formats.

Cadence detection is required and permits one to find the source format of a sequence of video fields, or detect the absence of motion between frames (still pictures). Typically, when a video source is a Telecine source, i.e., originally progressive film-source, inverse Telecine can recover the video, without picture quality degradation induced by a de-interlacer.

As known in the art, cadence detection is based on comparisons of pixels belonging to successive fields of index n and performed in order to determine the existence of motion between one frame and another. A conversion typically leads to abrupt motion as described with reference to U.S. Patent Application Publication No. 2007/0296858. U.S. Patent Application Publication No. 2007/0296858 also describes conventional and exotic cadence detection based on searching for a cadence pattern in a sequence of bits representative of inter-field motion and also accounting for field skip and/or repeat situations.

The conventional cadence detectors have limited robustness. For example, the limited robustness is due many cadences to be checked including conventional (2:2 and 3:2) and exotic cadences. In addition, conventional cadence detectors have long latencies especially as the cadence length is increased, e.g., Telecine B—25 fields.

Accordingly, there is a need in the art to robustly, rapidly and efficiently provide cadence detection.

SUMMARY OF THE INVENTION

Accordingly, the invention is directed to an apparatus and method for exotic cadence detection that substantially obviates one or more of the problems due to limitations and disadvantages of the related art.

An advantage of the invention is to provide a method to increase robustness of a cadence detection system.

Another advantage of the invention is to provide a solution that has a relatively short latency for cadence detection even with longer and exotic cadences, e.g., Telecine B.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a method of providing cadence detection is provided. The method includes using an inter-frame/field motion and motion auto-correlation step to detect cadence and a motion cross-correlation step using the interframe/field motion information and detected cadence to determine cadence phase.

Another aspect of the invention is directed towards a film mode detecting apparatus. The film mode detecting apparatus includes an inter-frame/field motion detector, a motion auto-correlation unit coupled to the inter-frame/field motion detector, a motion cross-correlation unit coupled to the motion auto-correlation unit, and a cadence pattern storage look-up-table coupled to the motion cross-correlation unit.

Yet another aspect of the invention is directed towards a processing system for processing a sequence of video fields. The processing system includes an inter-frame/field motion detector, a motion auto-correlation unit coupled to the inter-frame/field motion detector, a motion cross-correlation unit coupled to the motion auto-correlation unit, a cadence pattern storage look-up-table coupled to the motion cross-correlation unit, and a reset signal generator coupled to the motion auto-correlation unit configured to provide a reset signal based upon at least one of a scene change, cadence break, or phase break.

Still yet another aspect of the invention is directed towards a method for detecting film mode. The method includes the steps of receiving a video signal, detecting a cadence with an inter-frame/field motion detector and a motion auto-correlation detector, and determining a cadence phase with a motion cross-correlation unit and the detected cadence. In addition, a reset signal may be generated with a reset generator and provided to the motion auto-correlation detector.

It is to be understood that both the foregoing general description and the following detailed description are exemplary and explanatory and are intended to provide further explanation of the invention as claimed. In addition, various aspects of the invention may be generated with software or hardware as known in the art.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 illustrates an exemplary diagram of a table of conventional and exotic cadences;

DETAILED DESCRIPTION OF THE ILLUSTRATED EMBODIMENTS

Reference will now be made in detail to an embodiment of the present invention, an example of which is illustrated in the accompanying drawings.

Figure 1:
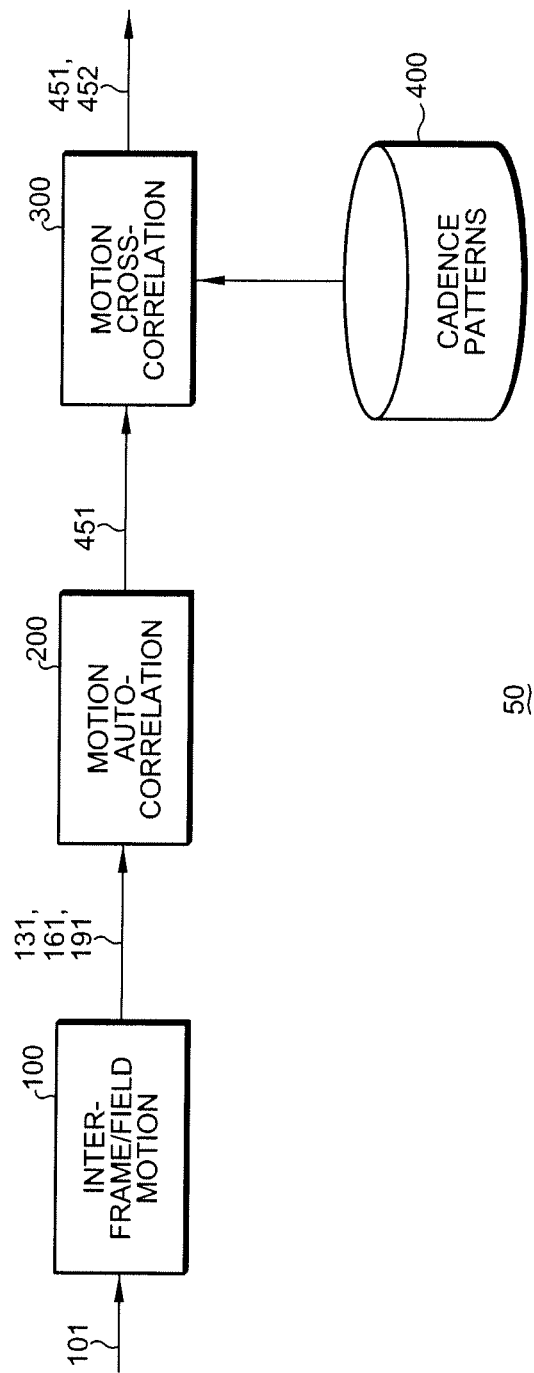
FIG. 1 illustrates an exemplary diagram of an exotic cadence detector system according to an embodiment of the invention.

FIG. 1 illustrates an exemplary diagram of an exotic cadence detector system according to an embodiment of the invention.

Referring to FIG. 1, the exotic cadence detector system is generally depicted as reference number 50. The exotic cadence detector system 50 includes an inter-frame/field motion detector 100, a motion auto-correlation unit 200 coupled to the inter-frame/field motion detector 100, a motion cross-correlation unit 300 coupled to the motion auto-correction unit 200 and a cadence pattern storage look-up-table 400 coupled to the motion cross-correlation unit 300.

In a preferred embodiment, the inter-frame/field motion detector 100 receives an input, e.g., video signal 101. The video signal 101 may include luminance Y and chrominance UN components. Optionally, a simpler and lower cost implementation of the cadence detector could be based solely on a luminance Y component. The exotic cadence detector system 50 is configured to output a cadence pattern 451 and a cadence phase 452 detected for a field or a part of a field.

Figure 2:
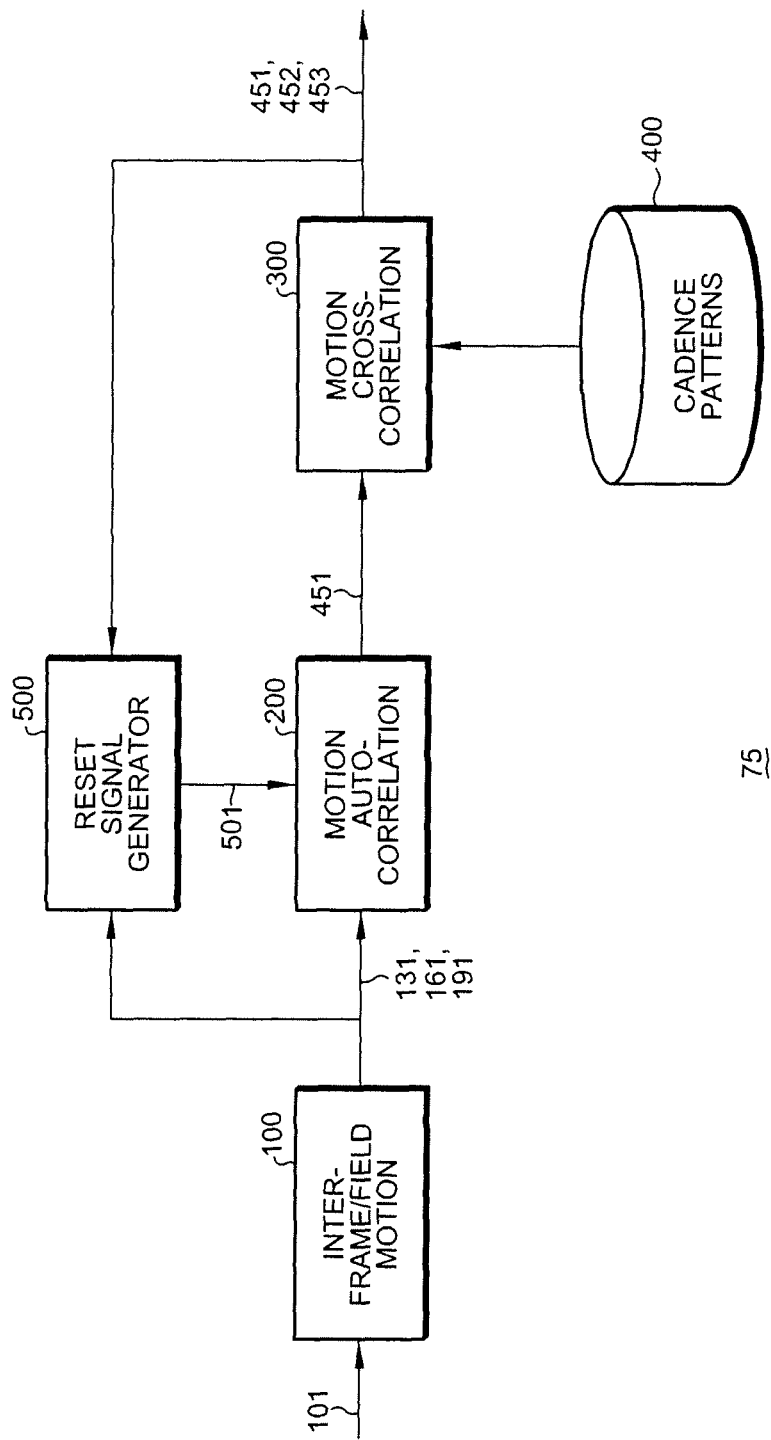
FIG. 2 illustrates an exemplary diagram of an exotic cadence detector according to another embodiment of the invention.

FIG. 2 illustrates an exemplary diagram of an exotic cadence detector according to another embodiment of the invention.

Referring to FIG. 2, the exotic cadence detector system is generally depicted as reference number 75. The exotic cadence detector system 75 includes an inter-frame/field motion detector 100, a motion auto-correlation unit 200 coupled to the inter-frame/field motion detector 100, a motion cross-correlation unit 300 coupled to the motion auto-correction unit 200 and a cadence pattern storage look-up-table 400 coupled to the motion cross-correlation unit 300. In addition, in this embodiment, a reset signal generator 500 configured to provide a reset signal 501 to the motion auto-correlation unit 200 and the motion cross-correlation unit 300 is also included.

The inter-frame/inter-field motion detector 100, described in greater detail below with reference to FIGS. 3, 4, 5 and 6, is configured to receive an input video signal 101 and provide an average inter-frame motion signal 131, an average inter-field motion signal 161, and an inter-frame motion dips signal 191. Optionally, the inter-frame/inter-field motion detector 140 may include a pre-filter 110 as further described with reference to FIG. 3, an inter-frame motion detector 100 as further described with reference to FIG. 4, an inter-field motion detector 160 as further described with reference to FIG. 5, and a repeat field detector 190 as further described with reference to FIG. 6.

The motion auto-correlation unit 200, described in detail below with reference to FIG. 7, receives the average inter-frame motion signal 131, the average inter-field motion signal 161, and the inter-frame motion dips signal 191 from the inter-frame/inter-field motion detector 100, the cadence patterns 400, the reset signal 501, and provides the cadence pattern 451 detected for a field or a part of a field.

Figure 13:
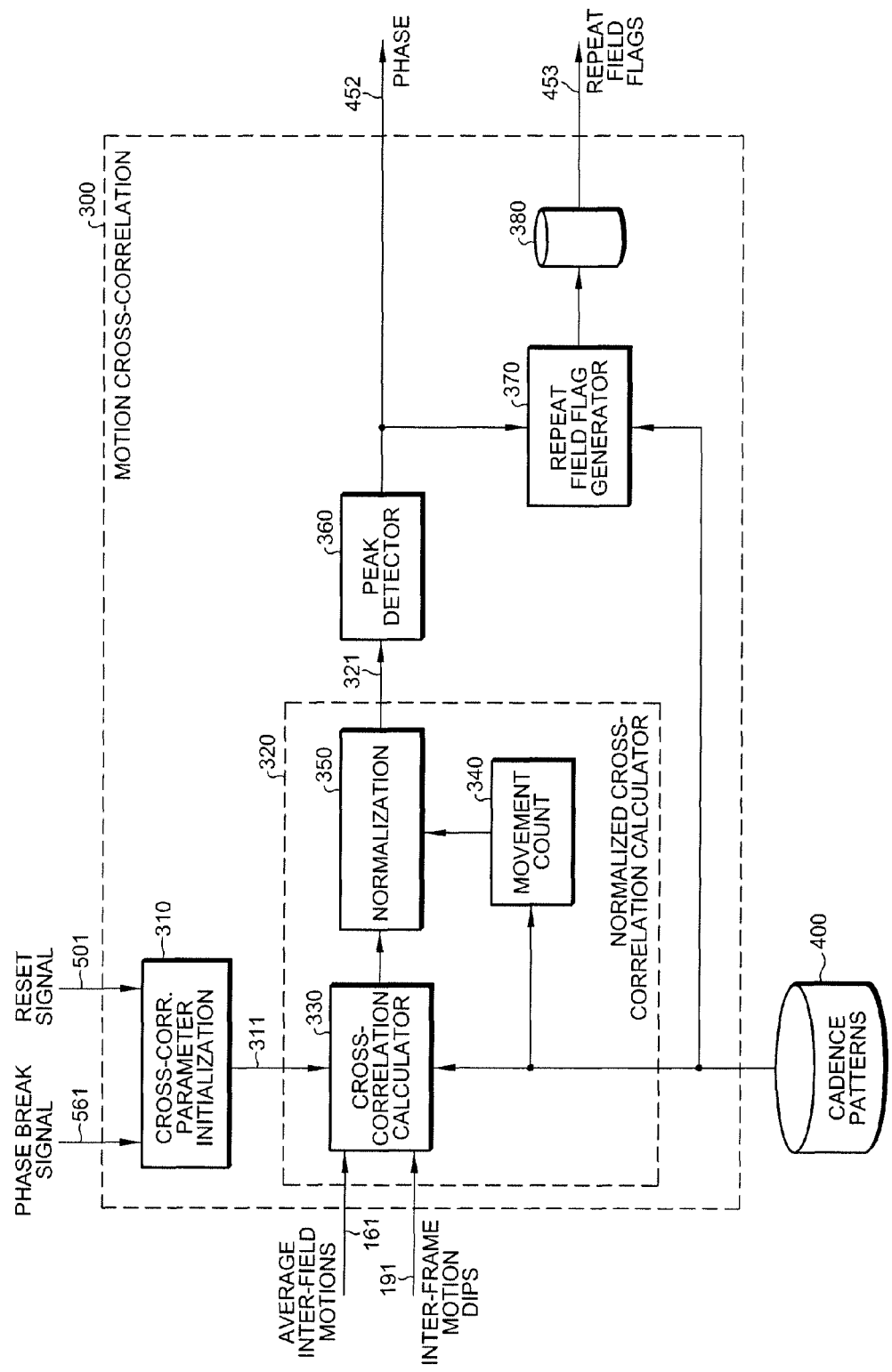
FIG. 13 illustrates an exemplary diagram of a motion cross-correlation unit.

The motion cross-correlation unit 300 described in detail below with reference to FIG. 13 is configured to receive the average inter-field motion signal 161 and the repeat field motion signal 191 provided by the inter-frame/inter-field motion detector unit 100. The motion cross-correlation unit 300 is also configured to receive cadence patterns from the cadence pattern look-up-table 400, a reset signal 501, and it is configured to provide a phase 452 and repeat field flags 453.

Figure 15:
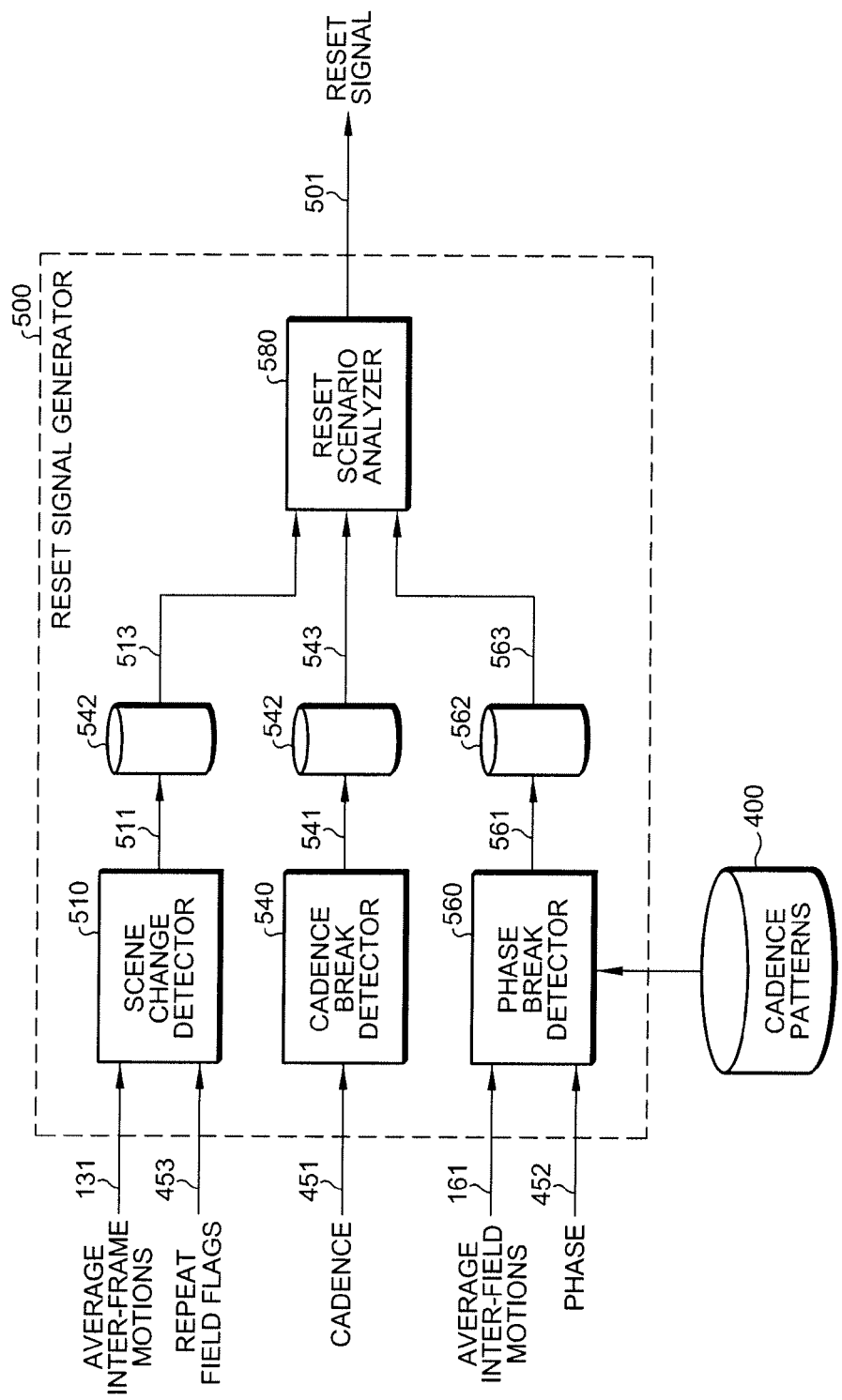
FIG. 15 illustrates an exemplary diagram of a reset signal generator.
Figure 16A:
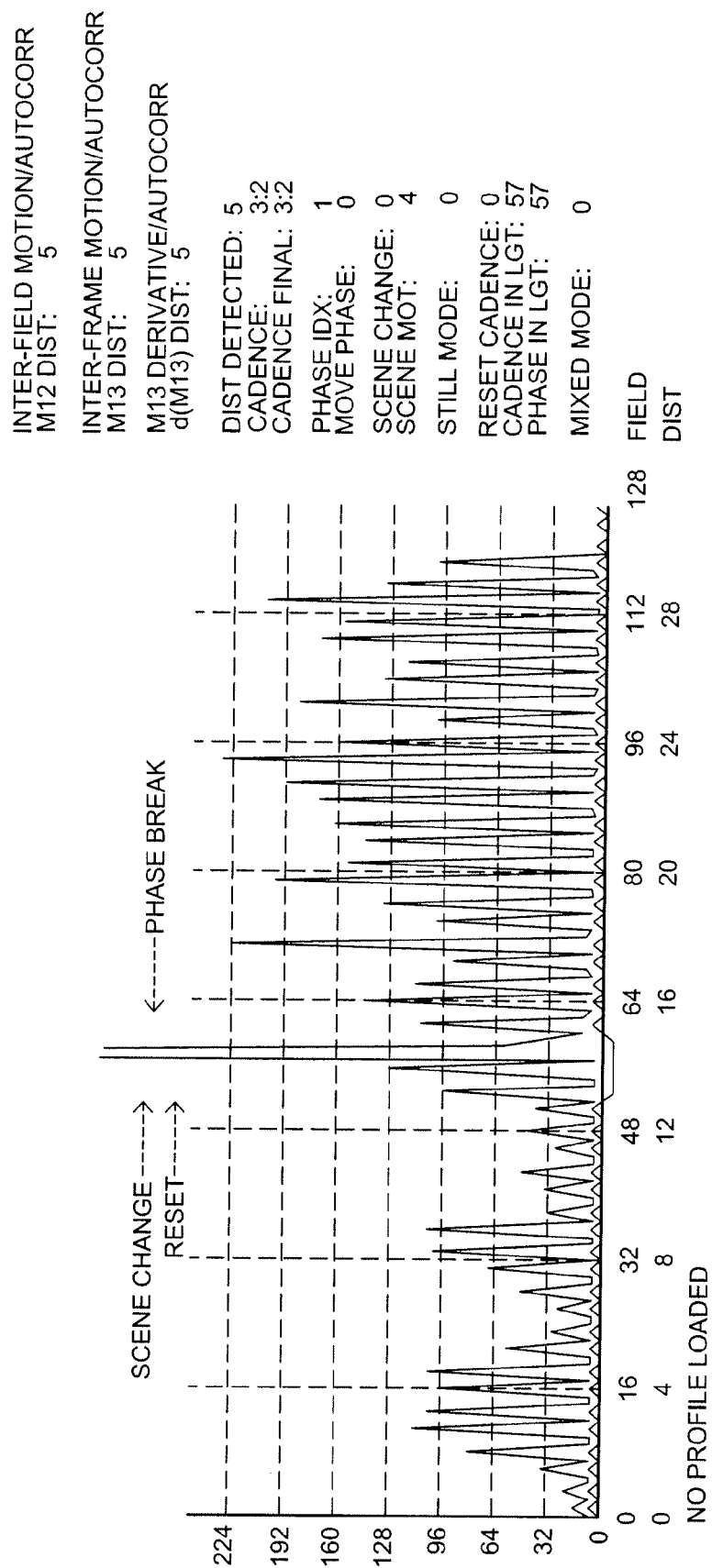
FIGS. 16(a) through 16(d) illustrate exemplary diagrams of reset signal generation scenarios.
Figure 16B:
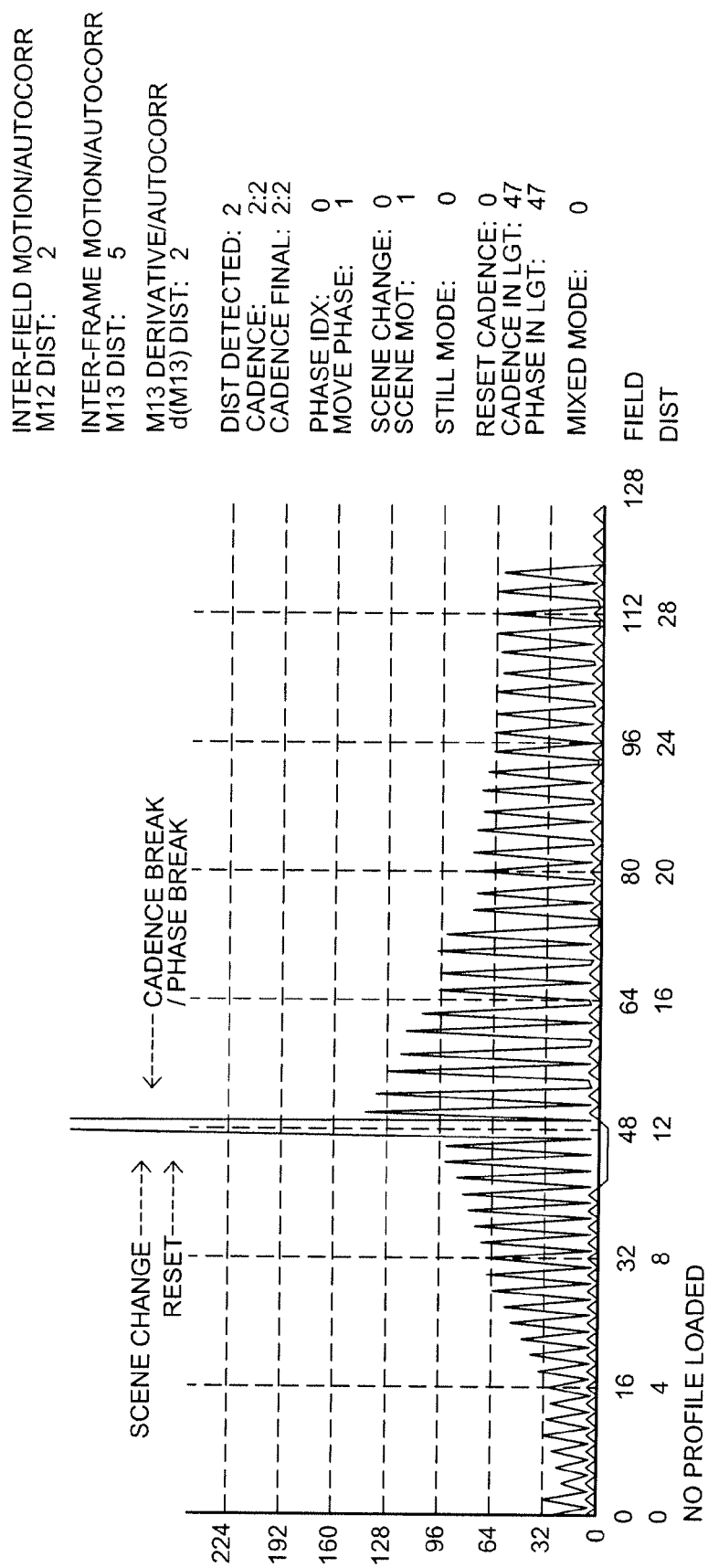
Figure 16C:
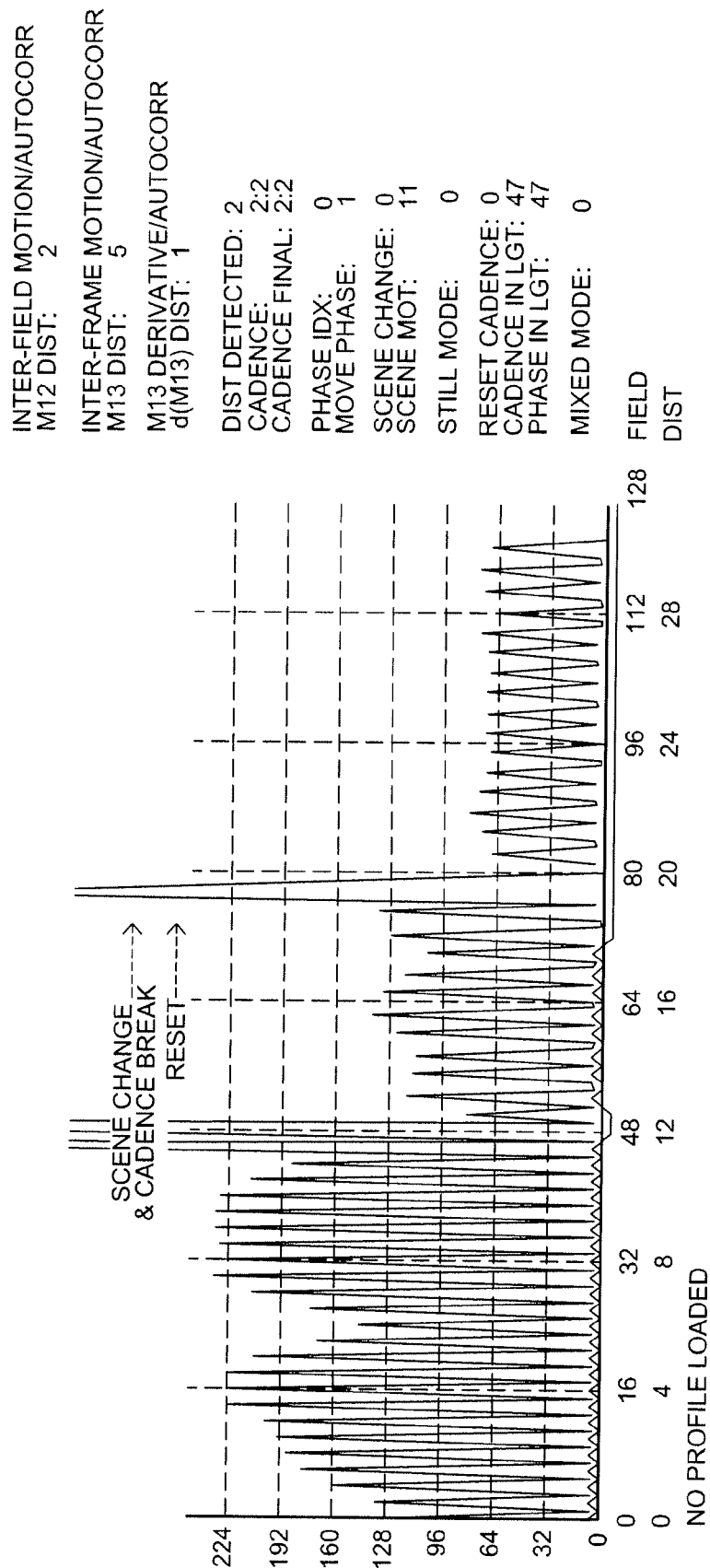
Figure 16D:
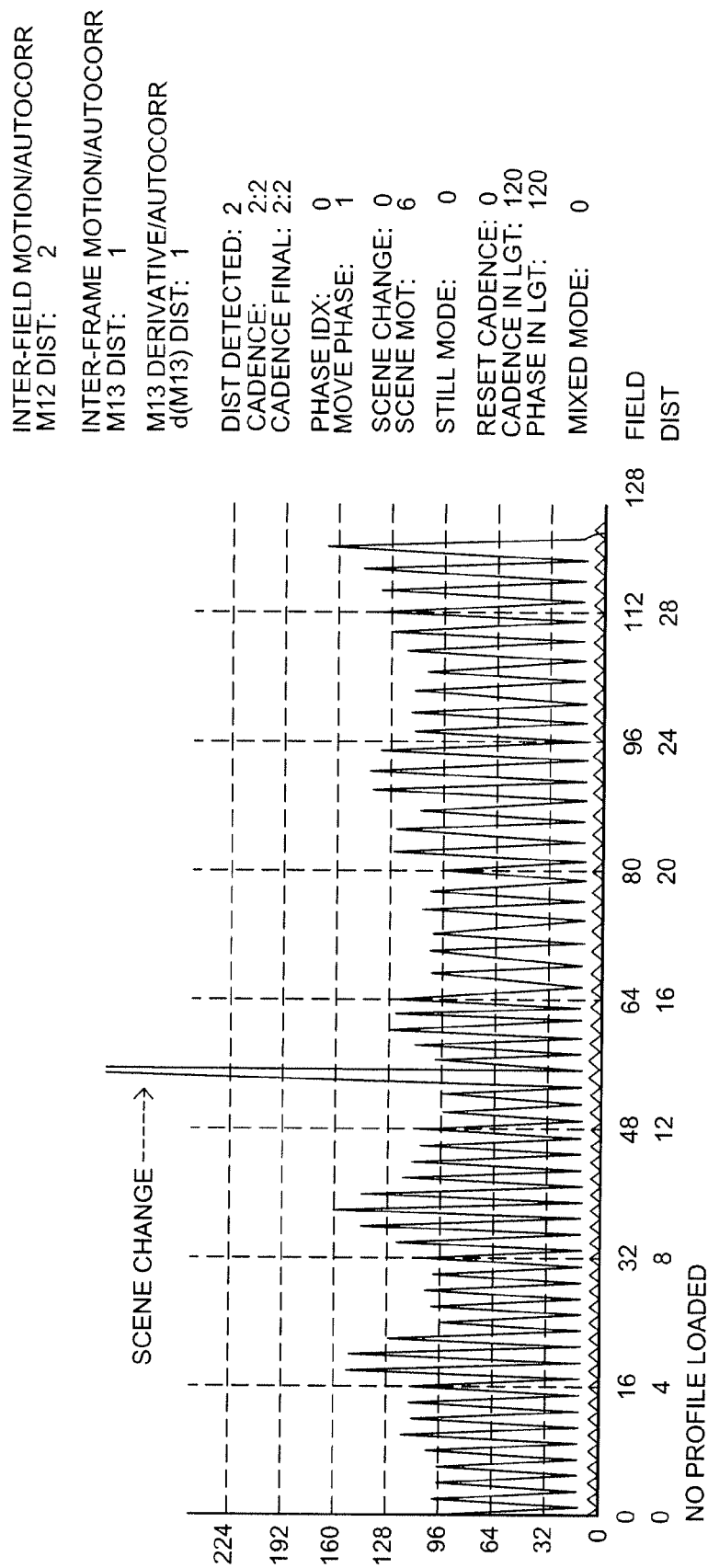

The cadence pattern look-up-table 400 is described in detail with reference to FIG. 9 and includes conventional and exotic cadences, cadence length, motion patterns and the like. The reset signal generator 500 (as seen in FIG. 15) receives the average inter-frame motions 131, the average inter-field motions 161, and the inter-frame motion dips 191 from the inter-frame/inter-field motion detector 100, it also receives the detected cadence 451, phase 452, repeat field flags 453, the cadence patterns 400, and provides the reset signal 501 to the motion auto-correlation unit 200 and the motion cross-correlation unit 300. The reset signal generator 500 is also further described in detail with reference to FIG. 15.

Figure 3:
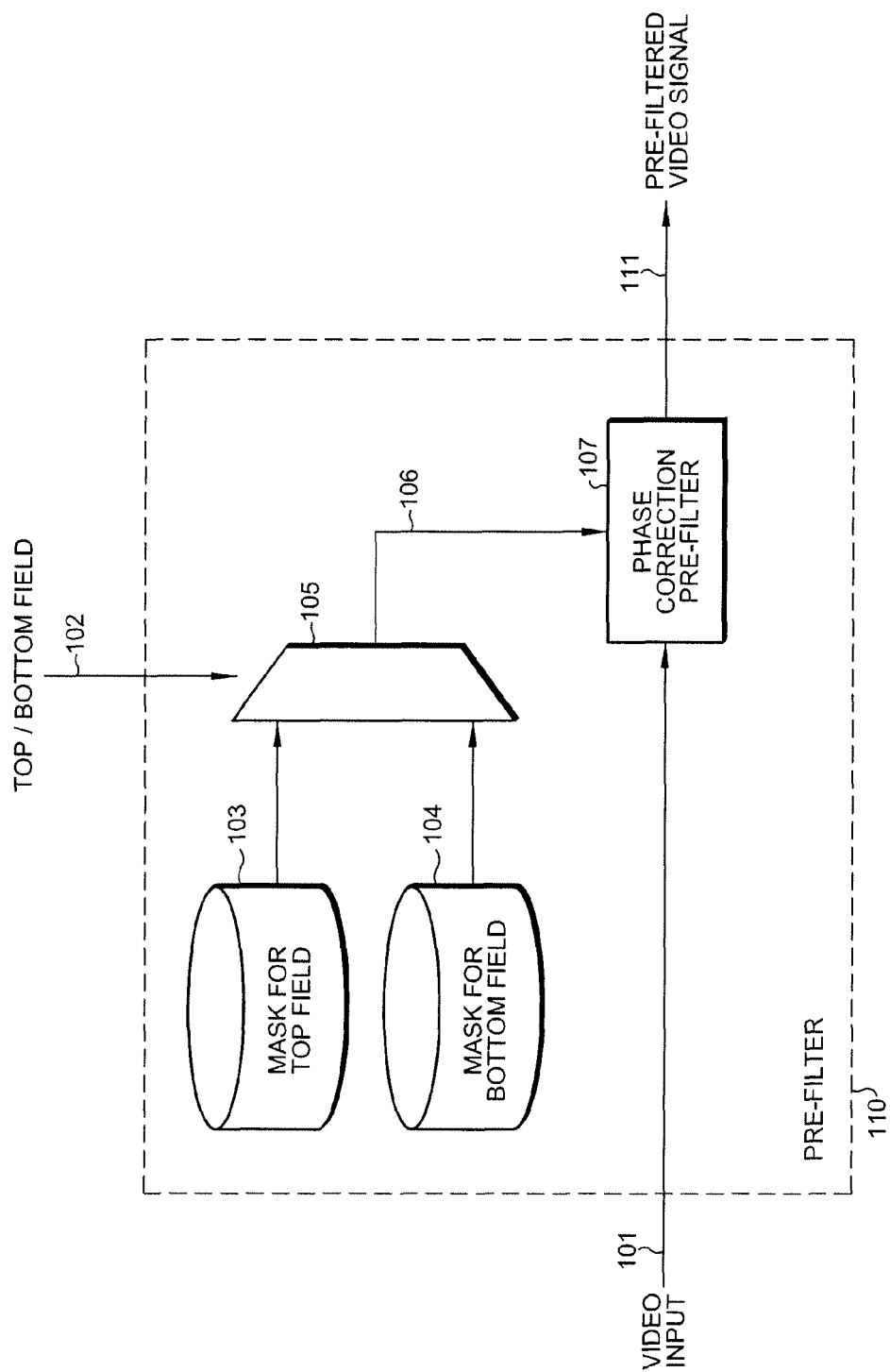
FIG. 3 illustrates an exemplary diagram of a motion pre-filter.

FIG. 3 illustrates an exemplary diagram of a motion pre-filter. Referring now to FIG. 3, the motion pre-filter 110 is generally described and is part of the inter-frame/inter-field motion detector 100. The motion pre-filter 110 is configured to receive input video signal 101 and its field parity signal 102, and further configured to provide a pre-filtered video signal 111. In a preferred embodiment, the input signal 101 and the output signal 111 include luminance Y and chrominance U/V components. Alternatively, a simplified implementation could be based on only a Y component.

The motion pre-filter 110 includes two pre-defined filter masks, a top field mask 103 and a bottom field mask 104. The outputs of the pre-defined filter masks are coupled to a multiplexer 105. The output of the multiplexer is coupled to a phase correction pre-filter 107. The phase correction pre-filter 107 is configured to receive an input video signal 101 and the selected filter mask 106 signal according to the field parity signal 102. The phase correction pre-filter 107 is also configured to provide a low-pass filtered video signal 111. Those skilled in the art will appreciate how the filtering process is done as in digital image processing, and the advantage of using the pre-filter 110 to adjust the phase of fields with top/bottom parity respectively and to provide noise immunity.

Figure 4:
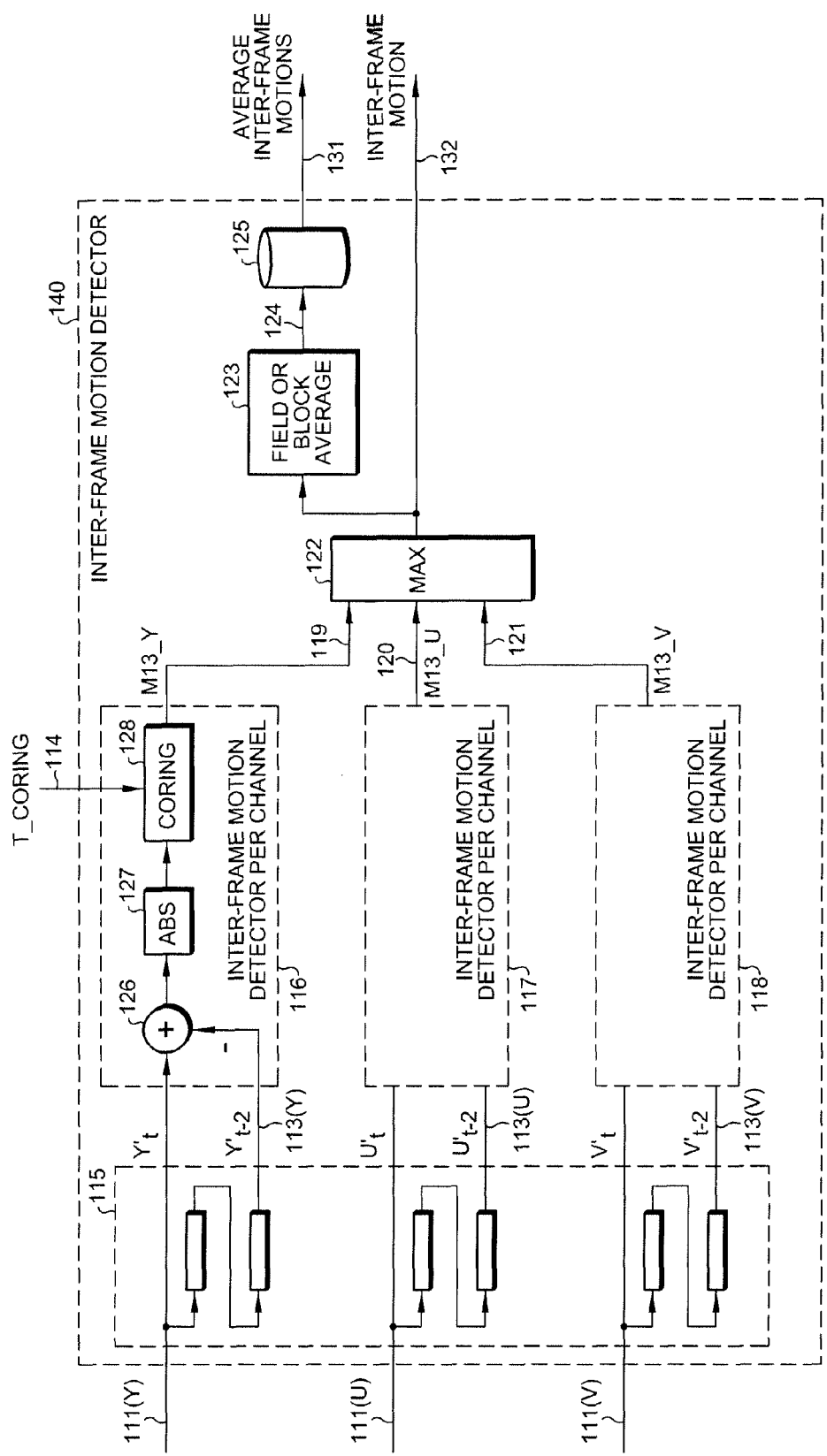
FIG. 4 illustrates an exemplary diagram of an inter-frame motion detector.

FIG. 4 illustrates an exemplary diagram of an inter-frame motion detector.

Referring to FIG. 4, the inter-frame motion detector is generally depicted as reference number 140 and is part of the inter-frame/inter-field motion detector 100. In a preferred embodiment, the inter-frame motion detector 140 receives the pre-filtered video signal 111 provided by the motion pre-filter 110. Optionally, the inter-frame motion detector 140 may receive the input video signal 101 without going through the motion pre-filter 110. The inter-frame motion detector 100 may also output an inter-frame motion signal 132 and an array of average inter-frame motions 131.

In a preferred embodiment, the inter-frame motion detector 140 includes a bank of field buffers 115 coupled to three inter-frame motion detectors per channel 116, 117, and 118. The inter-frame motion detectors are coupled to a max operator 122, a field or block average operator 123, and an array buffer 125. The inter-frame motion detector 140 may be configured to analyze luminance Y and chrominance U/V motions. In another embodiment, the inter-frame motion detector 140 may be configured to analyze only luminance Y motion to reduce cost. Those skilled in the art would readily understand how this may be implemented without the max operator 122 and with only one inter-frame motion detector per channel 116.

In a preferred embodiment, the inter-frame motion detector per channel 116 receives a Y component of the video signal 111, two-field delayed signals 113, and a noise immunity control parameter t_coring 114. The motion signal 119 is also of the Y component. The inter-frame motion detector per channel 116 includes an adder 126, an absolute operator 127 coupled to the adder 126, and a coring unit 128 coupled to the absolute operator 127. The inter-frame motion detector per channel 117 and inter-frame motion detector per channel 118 are configured to receive different component signals but would be similar to inter-frame motion detector per channel 116.

Figure 5:
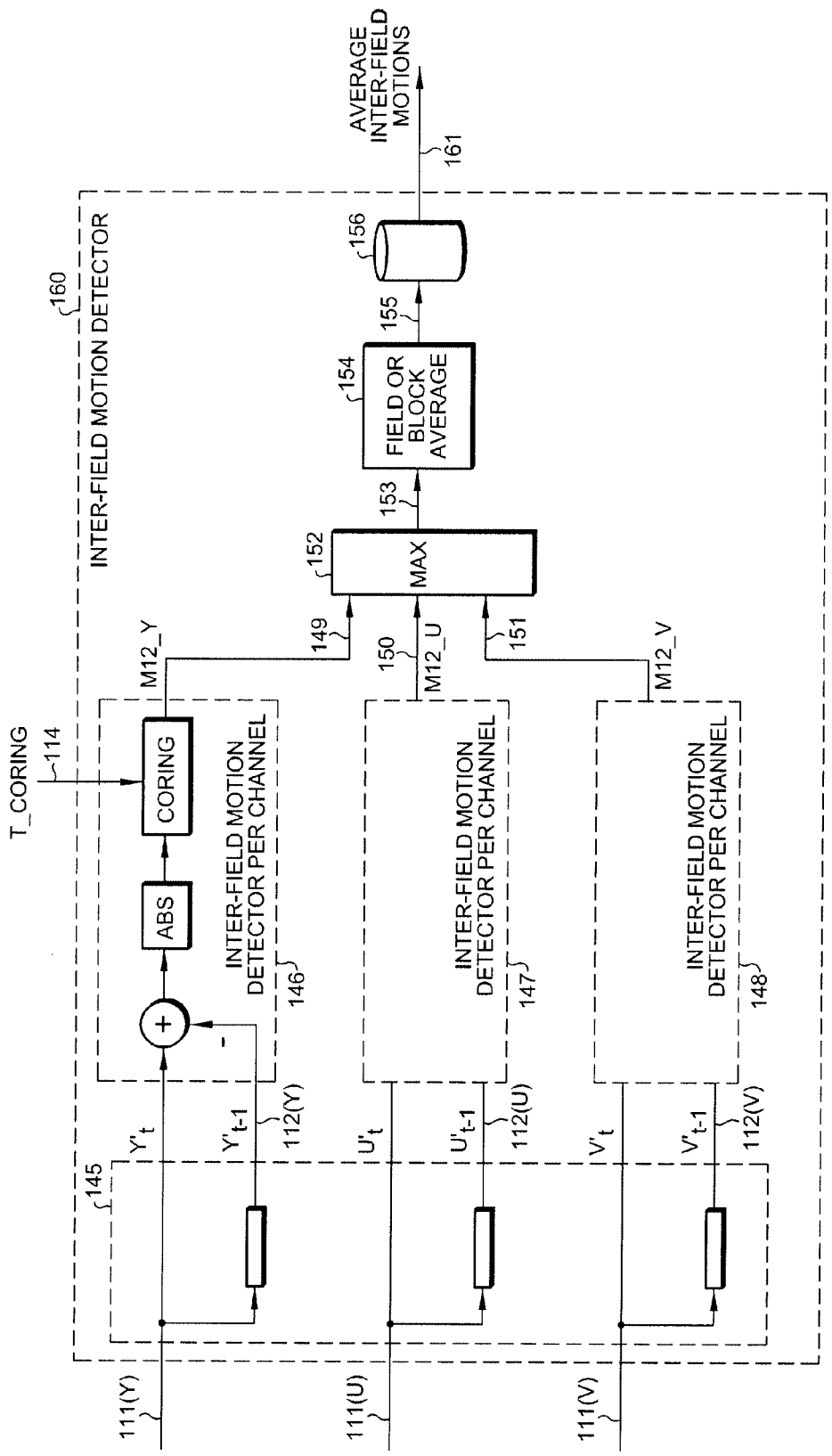
FIG. 5 illustrates an exemplary diagram of an inter-field motion detector.

FIG. 5 illustrates an exemplary diagram of an inter-field motion detector. Referring to FIG. 5, the inter-field motion detector 160, as part of the inter-frame/inter-field motion detector 100 is shown. In a preferred embodiment, the inter-field motion detector 160 receives the pre-filtered video signal 111 provided by the pre-filter 110. Alternatively, the inter-field motion detector 160 receives the input video signal 101 without going through the pre-filter 110. The inter-field motion detector 160 is configured to output an array of average inter-field motions 161.

In a preferred embodiment, the inter-field motion detector 160 includes a bank of field buffers 145, three inter-field motion detector per channel 146, 147, and 148 coupled to the bank of field buffers 145, a max operator 152 coupled to the three inter-field motion detectors per channel 146, 147, and 148, a field or block average operator 154 coupled to the max operator 152, and an array buffer 156 coupled to the average operator 154.

The inter-field motion detector 160 is configured to analyze luminance Y and chrominance U/V motions. In another embodiment, the inter-field motion detector 160 analyzes only luminance Y motion to reduce cost. The inter-field motion detector per channel 146, 147, and 148 is configured to receive different video signals and is similar to the inter-frame motion detector per channel 116 as described herein.

Figure 6:
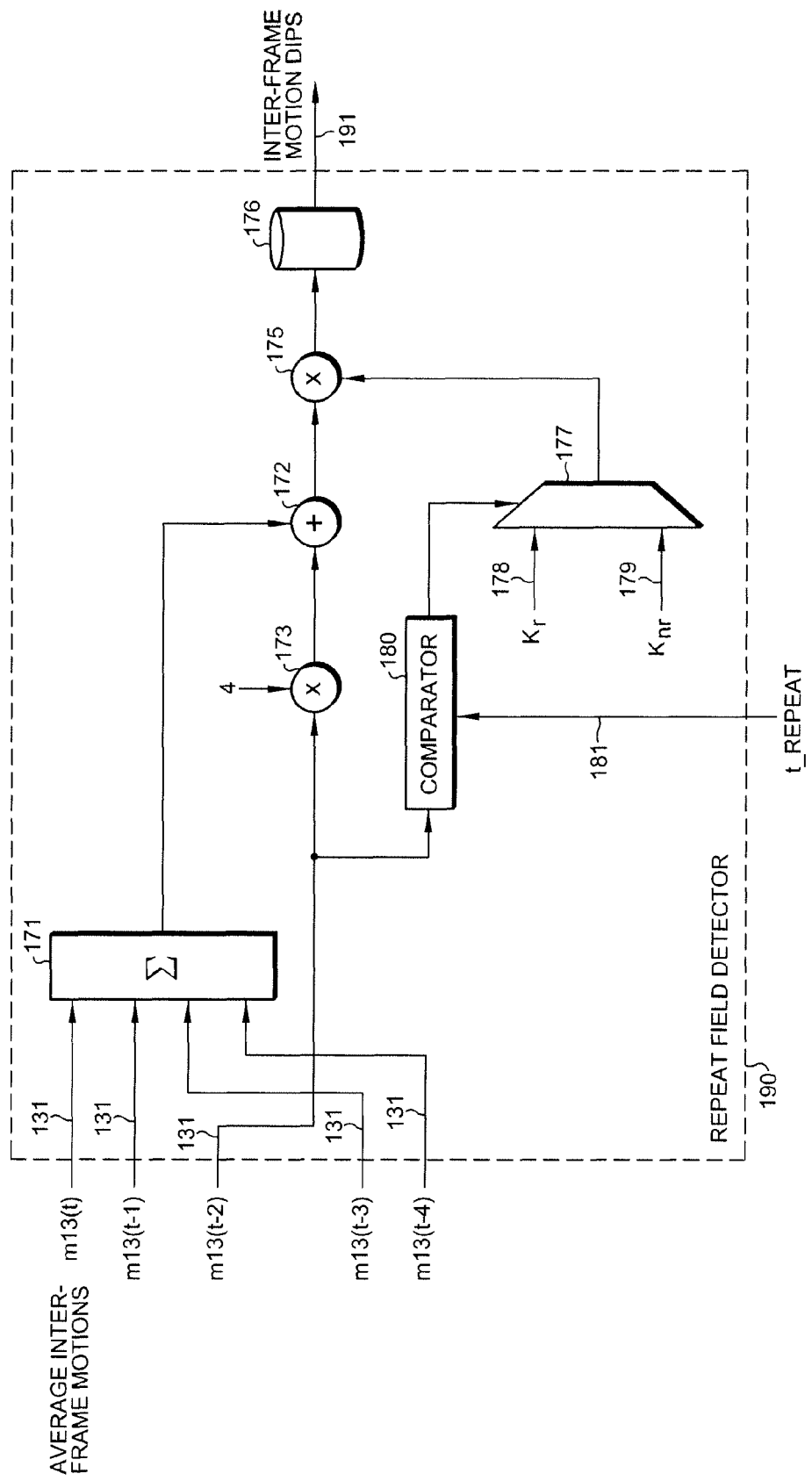
FIG. 6 illustrates an exemplary diagram of a repeat field detector.

FIG. 6 illustrates an exemplary diagram of a repeat field detector.

Referring to FIG. 6, the repeat field detector is generally depicted as reference number 190 and is part of the inter-frame/inter-field motion detector 100. The repeat field detector 190 is configured to receive an array of average inter-frame motions 131 and a repeat motion threshold 181 and also configured to provide inter-frame motion dips 191.

In a preferred embodiment, the repeat field detector 190 includes a summation unit 171, a first multiplier 173, an adder 172, a second multiplier 175 coupled to the adder 172, a comparator 180, a multiplexer 177 coupled to the comparator 180, a second multiplier 175, and a storage unit 176, e.g., an array buffer.

In one embodiment, the summation unit 171 is configured to receive the array of average inter-frame motions 131 at predetermined time intervals t, t−1, t−3, and t−4 and also configured to output a sum 172. The sum 172 is subtracted by 4 times of the average inter-frame motion 131 at time t−2. The comparator 180 compares 131 at time t−2 and a repeat motion threshold 181, selects the parameter $k_r$ if 131 at time t−2 is lower than the repeat motion threshold 181, and selects k, otherwise. In a preferred embodiment, $k_r$ and k, may be ½ and ¼. In addition, those skilled in the art, would readily understand that $k_r > k_{nr}$ is to amplify the repeat field motion when there is higher confidence for the field at t−2 to be the repeat field.

Figure 7:
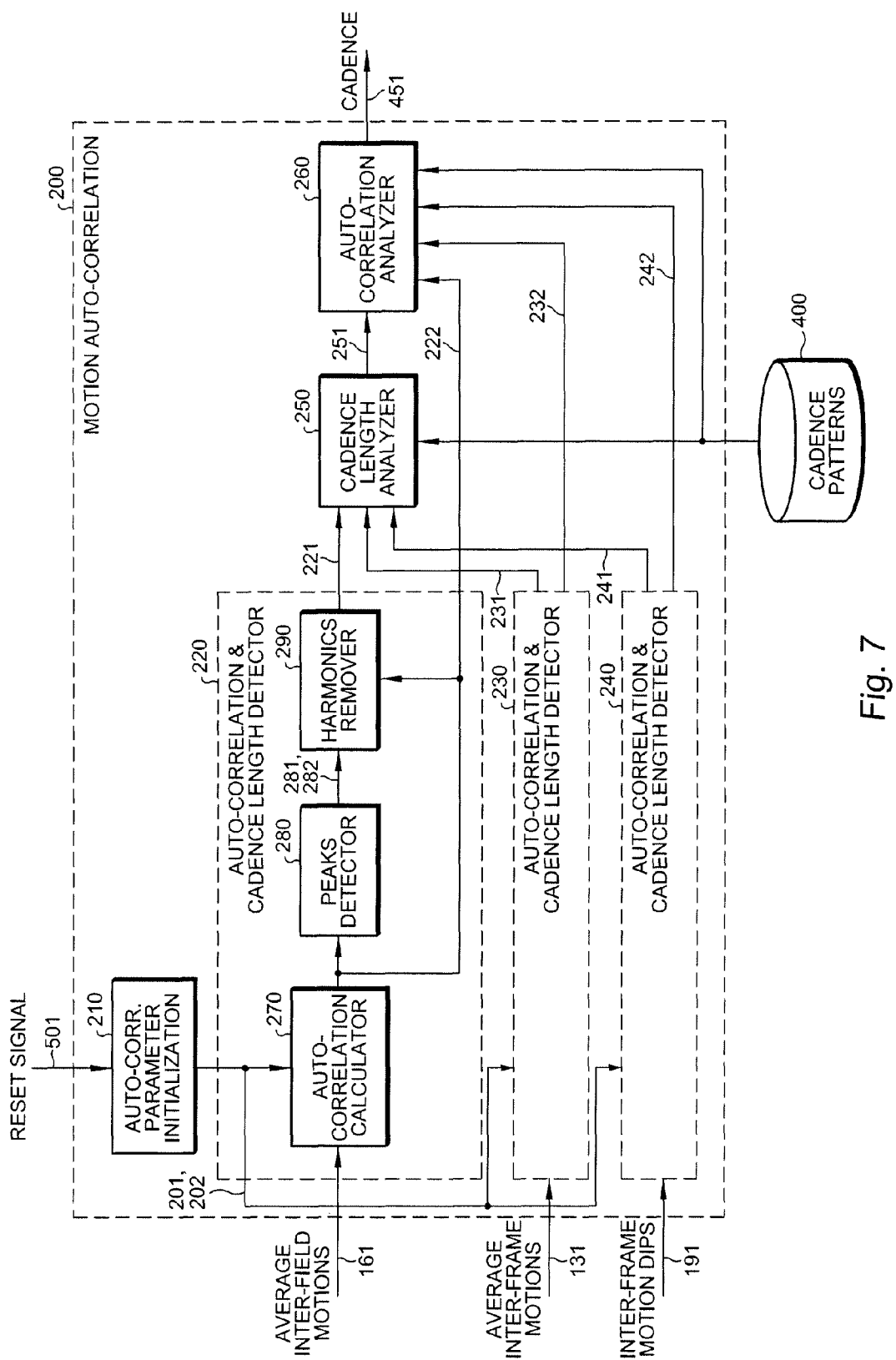
FIG. 7 illustrates an exemplary diagram of a motion auto-correlation unit.

FIG. 7 illustrates an exemplary diagram of a motion auto-correlation unit.

Referring to FIG. 7, a motion auto-correlation unit is generally depicted as reference number 200. The motion auto-correlation unit 200 is configured to receive a number of inputs including an array of average inter-frame motions 131, an array of average inter-frame motions 161, and an array of inter-frame motion dips 191. The cadence patterns look-up-table 400 is coupled to the motion auto-correlation unit 200 and configured to provide detected cadence patterns 451.

In a preferred embodiment, the motion auto-correlation unit 200 is configured to receive the reset signal 501 from a reset signal generator 500 (shown in FIG. 15) for the initialization of the control parameters. The motion auto-correlation unit 200 includes an auto-correlation parameter initialization unit 210, auto-correlation and cadence length detectors 220, 230, 240, a cadence length analyzer 250, and an auto-correlation analyzer 260. There may be more than three auto-correlation and cadence length detectors.

In an embodiment, the auto-correlation parameter initialization unit 210 initializes the motion auto-correlation parameters to a set of pre-defined values and provides at least a maximum detectable cadence length $\delta_{max}$ 201, and an auto-correlation input length $T_A$ 202. One of ordinary skill in the art would understand that array buffers 125, 156, and 176 need to store at least $T_A$ number of motions for the auto-correlation. In a preferred embodiment, the auto-correlation parameter initialization unit 210 is configured to receive a reset signal 501 from the reset signal generator 500 and to reset at least the maximum detectable cadence length $\delta_{max}$ 201 and the auto-correlation input length $T_A$ 202 according to the reset signal 501.

Figure 10:
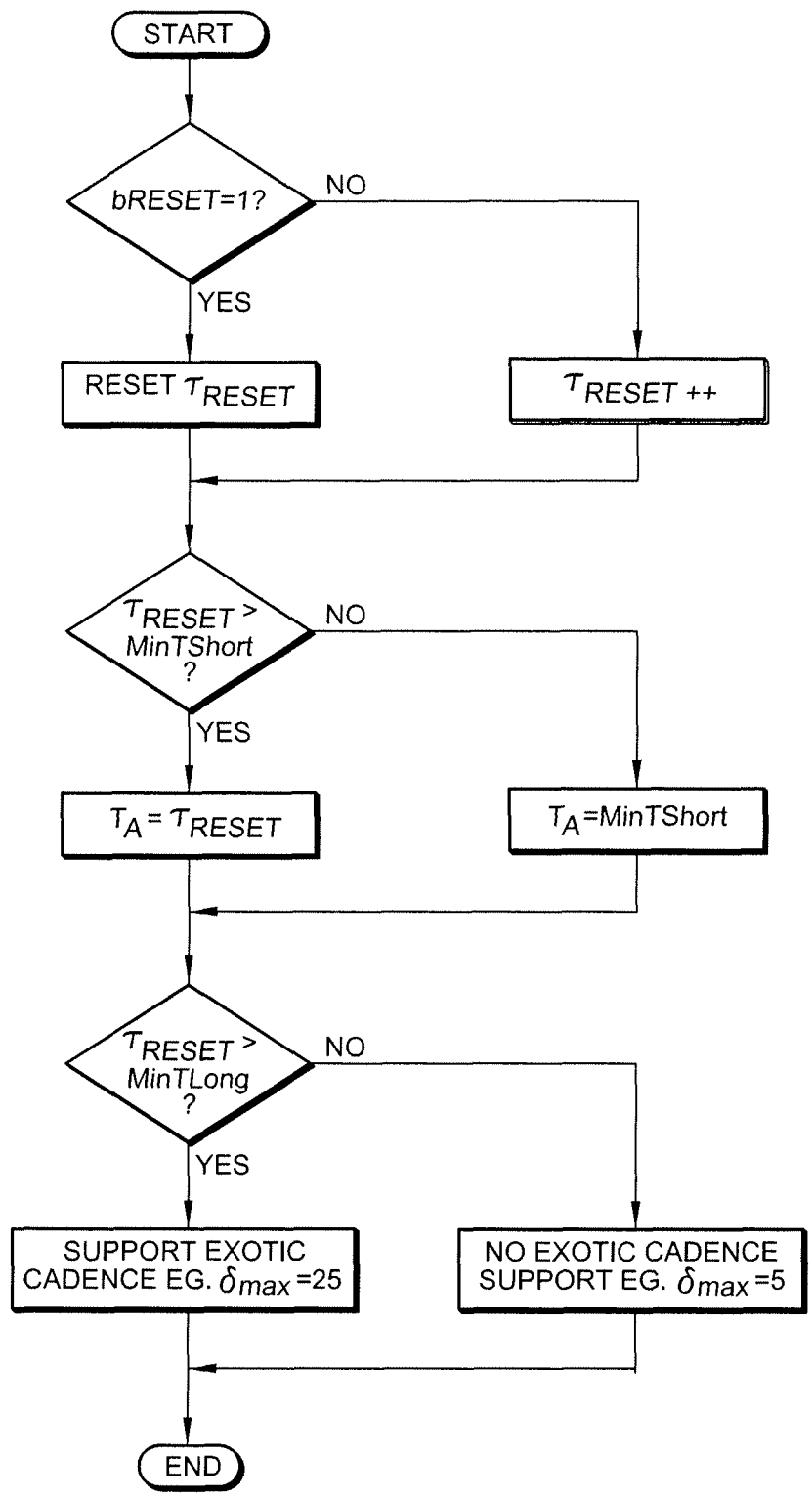
FIG. 10 illustrates an exemplary diagram of auto-correlation parameters initialization method.
Figure 11:
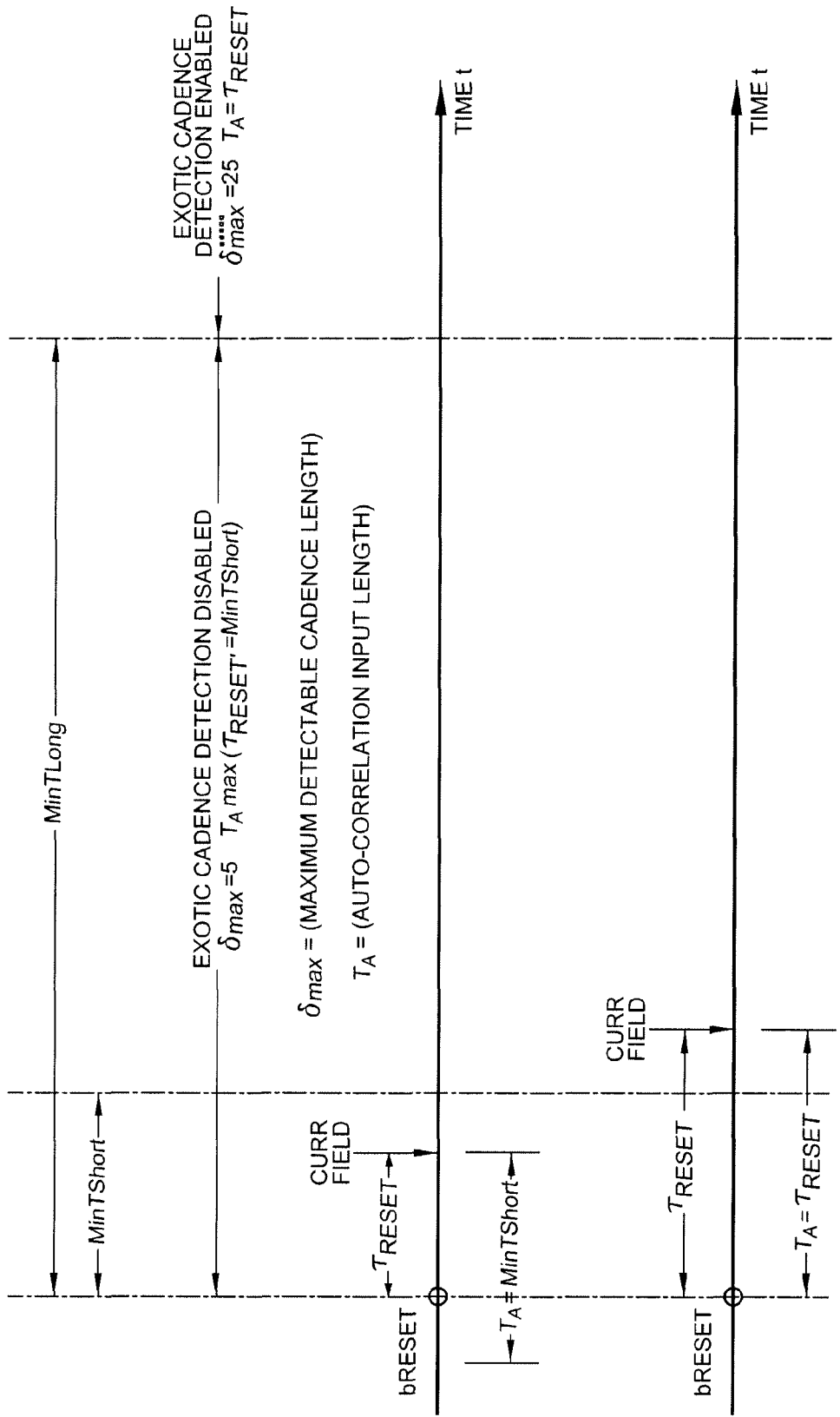
FIG. 11 illustrates an exemplary diagram of auto-correlation parameters initialization with time axis.

FIG. 10 illustrates an exemplary diagram of an auto-correlation parameters initialization method. FIG. 11 illustrates an exemplary diagram of an auto-correlation parameters initialization with time axis.

Referring to FIG. 10, a method of initializing the auto-correlation parameters $T_A$ and $\delta_{max}$ based on the reset signal 501 comprises steps of checking if the reset signal bReset is true, resetting the time after reset $\tau_{Reset}$ if yes, incrementing $\tau_{Reset}$ if no, checking if $\tau_{Reset}$ is larger than the minimum auto-correlation input length MinTShort, let the auto-correlation input length $T_A$ be the maximum of $\tau_{Reset}$ and MinTShort, checking if $\tau_{Reset}$ is larger than the duration control for conventional cadence detection period after the reset, supporting exotic cadence if yes eg. $\delta_{max}=25$, else supporting only convention cadence eg. $\delta_{max}=5$. Further explained in FIG. 11 is this method of auto-correlation parameters initialization with the time axis. One of ordinary skill in the art would understand that support of exotic cadence requires a long delay time while the conventional cadence, such as 2:2 and 3:2, may converge fast. Accordingly, the parameters MinTShort, MinTLong, and the adaptive short/long cadence support ensure that the short cadence detection converges fast and the long cadence detection would not be interrupted by breaks. Example values for MinTShort and MinTLong are 10 and 50 to support the cadences listed in FIG. 9.

Referring again to FIG. 7, the auto-correlation and cadence length detector 220 is configured to receive an array of average inter-field motions 161, the initialized parameters such as $\delta_{max}$ 201 and $T_A$ 202, and also configured to provide the detected cadence length 221 and the auto-correlation characteristics 222 to the cadence length analyzer 250 and the auto-correlation analyzer 260, respectively.

In an embodiment, the auto-correlation and cadence length detector 220 may include an auto-correlation calculator 270, a peaks detector 280 coupled to the auto-correlation calculator 270, and a harmonics remover 290 coupled to the peaks detector 280. The auto-correlation calculator 270 receives the array of motion m(t), where the time t∈[0, $T_A$], and provides the auto-correlation characteristics 222.

In an embodiment, Equation 1 below illustrates the calculation of auto-correlation for a candidate cadence length δ, where δ∈[2, $\delta_{max}$].

$$A(\delta) = \sum_{t=0}^{T_A - \delta_{max}} m(t) \cdot m(t+\delta) \quad \delta \in [2, \delta_{max}] \quad \text{Equation 1}$$

The peaks detector 280 receives an auto-correlation calculated by the auto-correlation calculator 270, and provides at least two peaks, namely the first peak 281 and the second peak 282.

Equation 2 is utilized to calculate the first peak $d_1$ and Equation 3 is used to calculate the second peak $d_2$.

$d_1 = \delta | A(\delta) = \max(A(\delta))$     Equation 2:

$d_2 = \delta | A(\delta) = \max(A(\delta)), \delta \neq d_1$     Equation 3:

The harmonics remover 290 receives the auto-correlation 222, the first peak 281 and the second peak 282, and provides the finally detected cadence length 221 (i.e. d).

Figure 8:
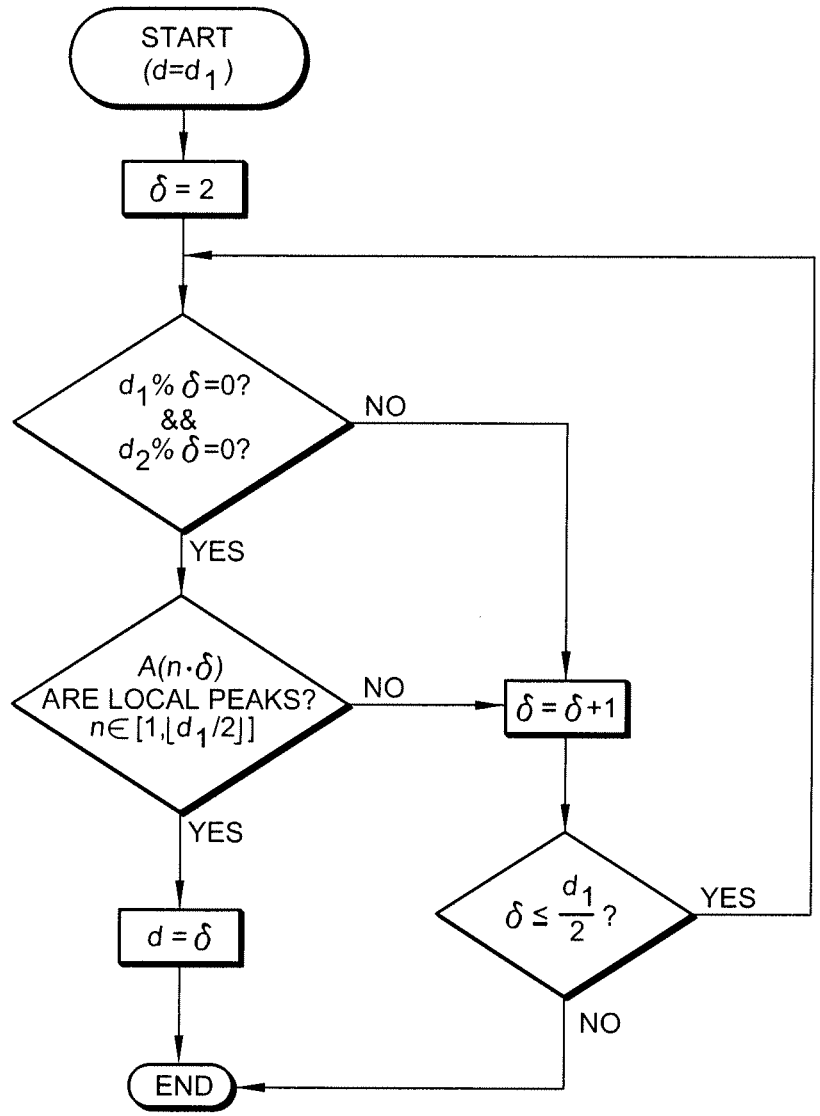
FIG. 8 illustrates an exemplary diagram of a harmonics removal method in the motion auto-correlation unit.

FIG. 8 illustrates an exemplary diagram of a harmonics removal method in the motion auto-correlation unit. The harmonics removal method comprises steps of initializing the cadence length variable δ to the minimum cadence length possible eg. 2, checking if δ is a fundamental period of $d_1$ and $d_2$, checking if A(n×δ) for all interger n∈[1,⌊$d_1$/2⌋] are local peaks eg. if A(n×δ)>A(n×δ−1) & A(n×δ)>A(n×δ+1) ∀n∈[1,⌊$d_1$/2⌋], let the finally detected cadence length d be δ if yes, and increment δ by 1 if no and $$\delta \leq \frac{d_1}{2}.$$

Referring again to FIG. 7, auto-correlation and cadence length detectors 230 and 240 are similar to auto-correlation and cadence length detector 220 described herein, but receive different motion signals and provide the cadence length and the auto-correlation based on the input motion signals.

The cadence length analyzer 250 is configured to receive the cadence patterns look-up-table 400, the detected cadence length 221, 231, and 241 from the auto-correlation and cadence length detectors 220, 230, and 240, respectively. The cadence length analyzer 250 is configured to provide a plurality of cadence candidates 251 to the auto-correlation analyzer 260. The cadence length analyzer 250 is also configured to reduce or eliminate false candidate cadences based on the detected cadence lengths and the prior known cadence length of each cadence candidate provided by 400 as tabulated in FIG. 9.

The auto-correlation analyzer 260 is configured to receive the cadence candidate 251, inputs from the cadence patterns look-up-table 400, auto-correlations 222, and inputs 232, 242. In addition, the auto-correlation analyzer 260 is configured to provide a detected cadence pattern 451.

The auto-correlation analyzer 260 makes the final decision of the cadence pattern by examining the features of the auto-correlation 222, 232, and 242. In a preferred embodiment, this may include comparing, e.g., the auto-correlation A(δ) of a plurality of candidate lengths δ, and/or comparing the auto-correlation of a plurality of candidate lengths to a plurality of thresholds.

FIGS. 12(a) to 12(j) illustrate exemplary diagrams of typical auto-correlations of the inter-field motions, inter-frame motions, and inter-frame motion dips for video and film mode cadence.

Referring now to FIGS. 12(a)-12(j), illustrating diagrams of autocorrelations in which the x-axis is the candidate cadence length δ and the y-axis is the value of the auto-correlation A(δ) after some normalization. Now referring to FIG. 12(a), a typical auto-correlation illustrated with the inter-field motion shown as 1202, the inter-frame motion shown as 1204, and the inter-frame motion dips shown as 1206 for video (non-film mode) cadence which is not listed in FIG. 9.

The detected cadence length 221, 231, and 241 detected by cadence length detectors 220, 230, and 240 are indicated by the 1208, 1210, and 1212, respectively. Based on these detected cadence lengths and the auto-correlation characteristics, the cadence length analyzer 250 and the auto-correlation analyzer 260 may provide the detected cadence pattern 451.

Figure 12A:
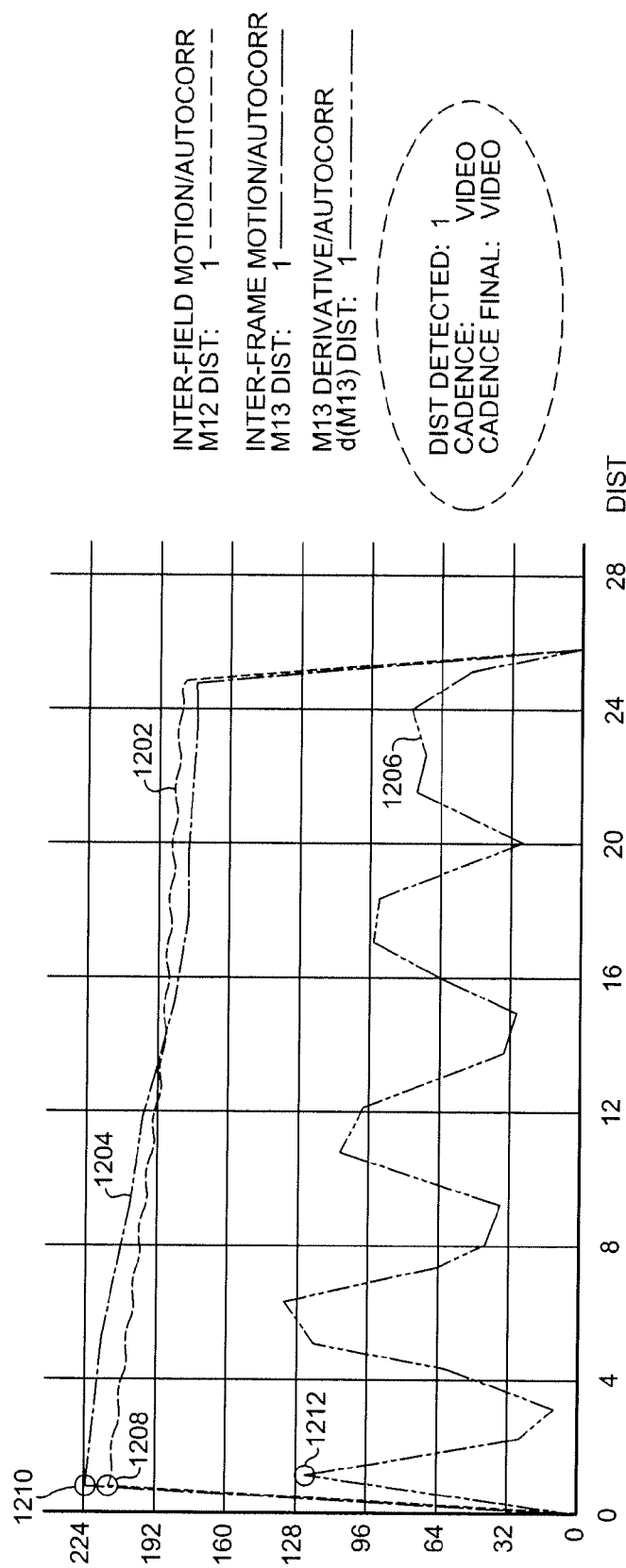
FIGS. 12(a) through 12(j) illustrate exemplary diagrams of typical auto-correlations of the inter-field motions, inter-frame motions, and inter-frame motion dips for video and film mode cadence.
Figure 12B:
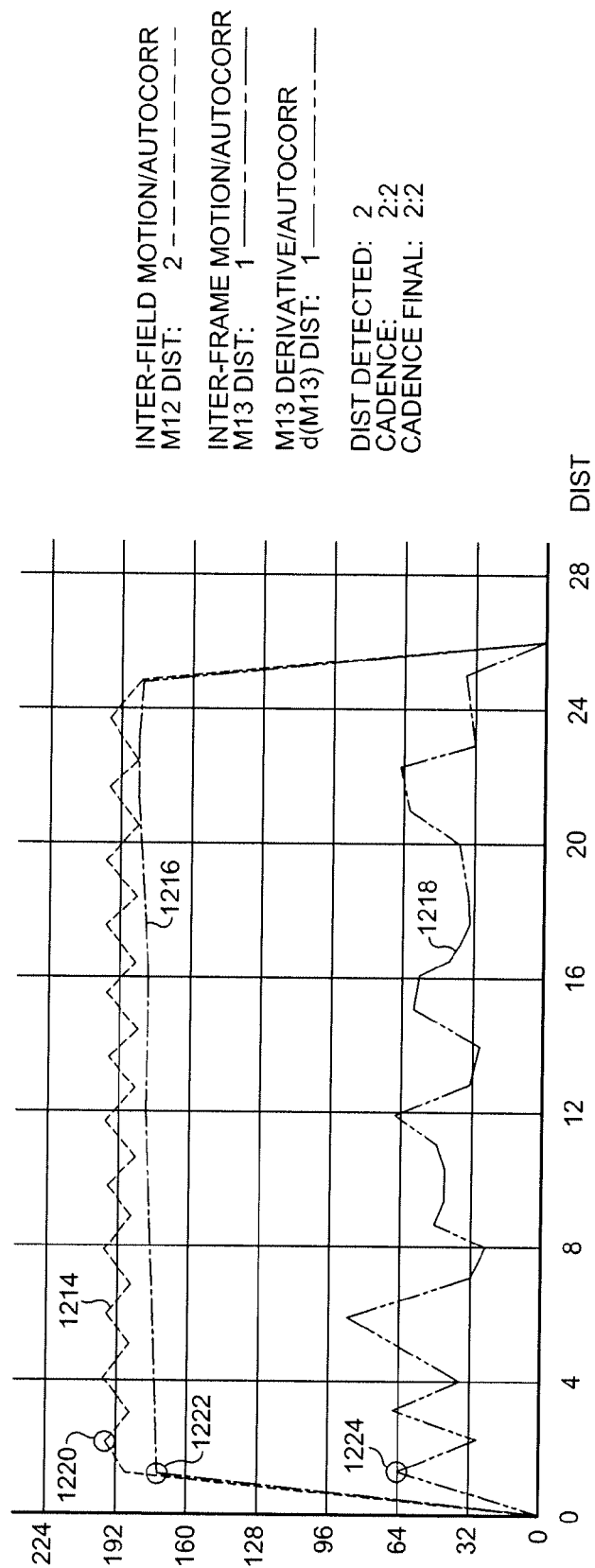

Now referring to FIG. 12(b), illustrating auto-correlation characteristics of the inter-field motion 1214, the inter-frame motion 1216, and the inter-frame motion dips 1218 for a 2:2 cadence listed in FIG. 9 are shown. The detected cadence length 221, 231, and 241 detected by cadence length detectors 220, 230, and 240 are indicated by circles 1220, 1222, and 1224, respectively. Based on these detected cadence lengths and the auto-correlation characteristics, the cadence length analyzer 250 and the auto-correlation analyzer 260 provide the detected cadence pattern 451.

Figure 12C:
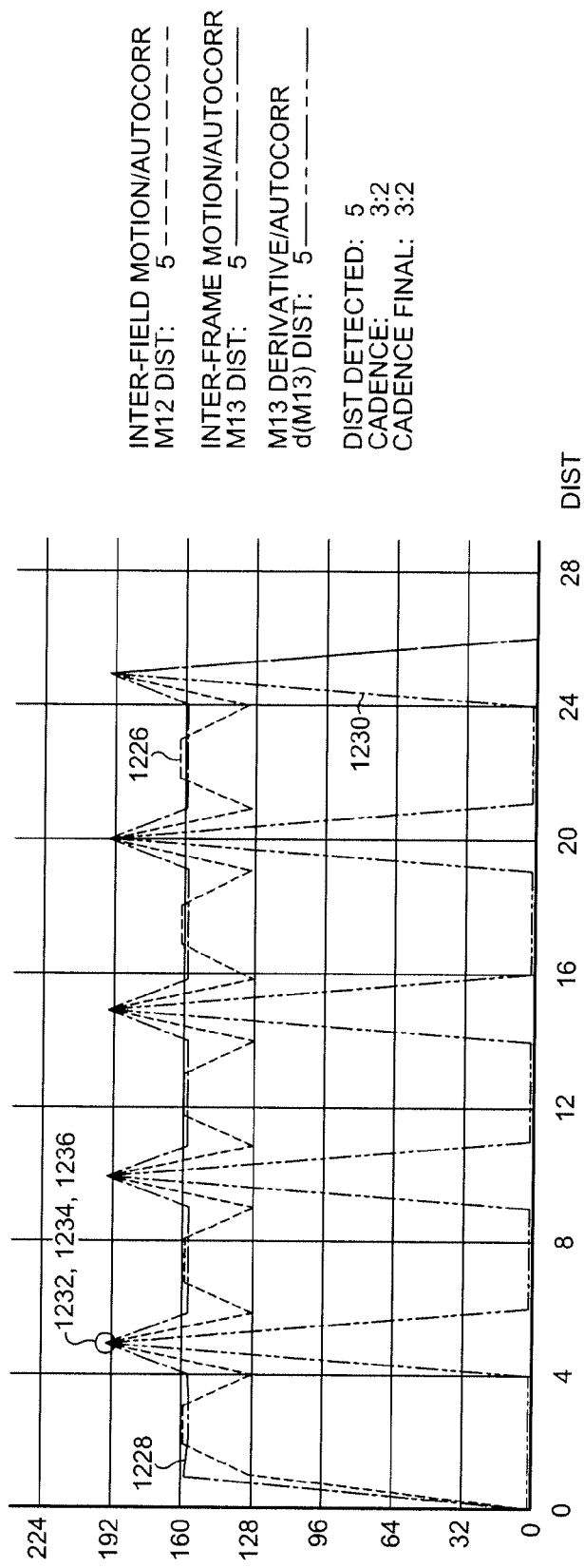

Referring now to FIG. 12(c), illustrating auto-correlation characteristics of the inter-field motion 1226, the inter-frame motion 1228, and the inter-frame motion dips 1230 for a 3:2 cadence listed in FIG. 9 are shown. The detected cadence length 221, 231, and 241 detected by cadence length detectors 220, 230, and 240 are indicated by circles 1232, 1234, and 1236, respectively. Based on these detected cadence lengths and the auto-correlation characteristics, the cadence length analyzer 250 and the auto-correlation analyzer 260 provide the detected cadence pattern 451.

Figure 12D:
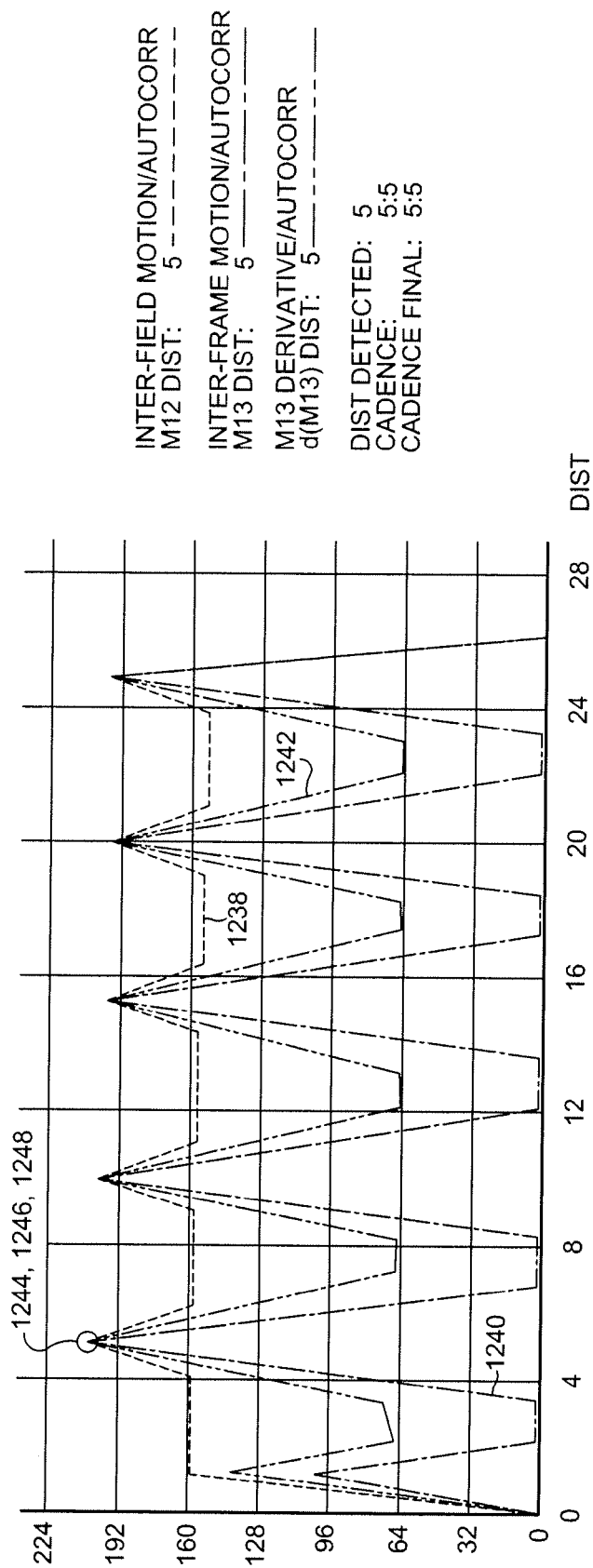

Referring now to FIG. 12(d) illustrating auto-correlation characteristics of the inter-field motion 1238, the inter-frame motion 1240 and the inter-frame motion dips 1242 for a 5:5 cadence listed in FIG. 9 are shown. The detected cadence length 221, 231, and 241 detected by cadence length detectors 220, 230, and 240 are indicated by circles 1244, 1246, and 1248, respectively. Based on these detected cadence lengths and the auto-correlation characteristics, the cadence length analyzer 250 and the auto-correlation analyzer 260 provide the detected cadence pattern 451.

Figure 12E:
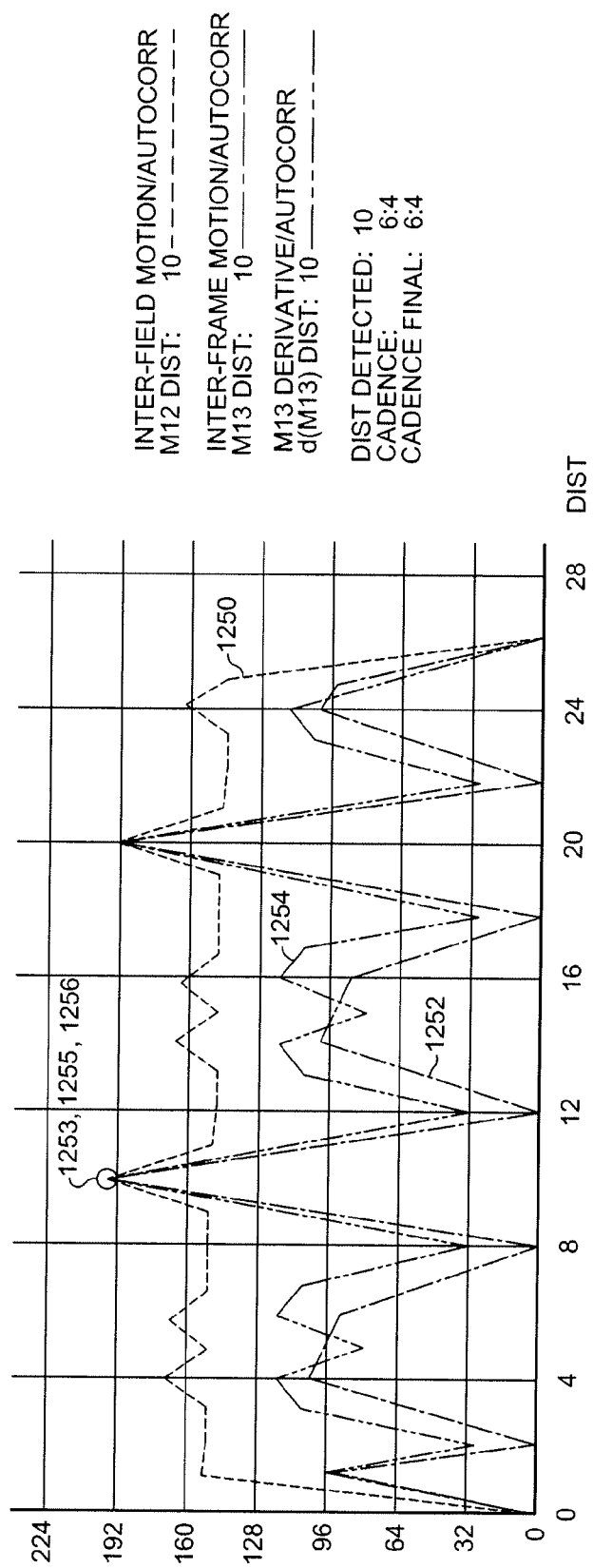

Referring now to FIG. 12(e) illustrating auto-correlation characteristics of the inter-field motion 1250, the inter-frame motion 1252 and the inter-frame motion dips 1254 for a 6:4 cadence listed in FIG. 9 are shown. The detected cadence length 221, 231, and 241 detected by cadence length detectors 220, 230, and 240 are indicated by circles 1253, 1255, and 1256, respectively. Based on these detected cadence lengths and the auto-correlation characteristics, the cadence length analyzer 250 and the auto-correlation analyzer 260 provide the detected cadence pattern 451.

Figure 12F:
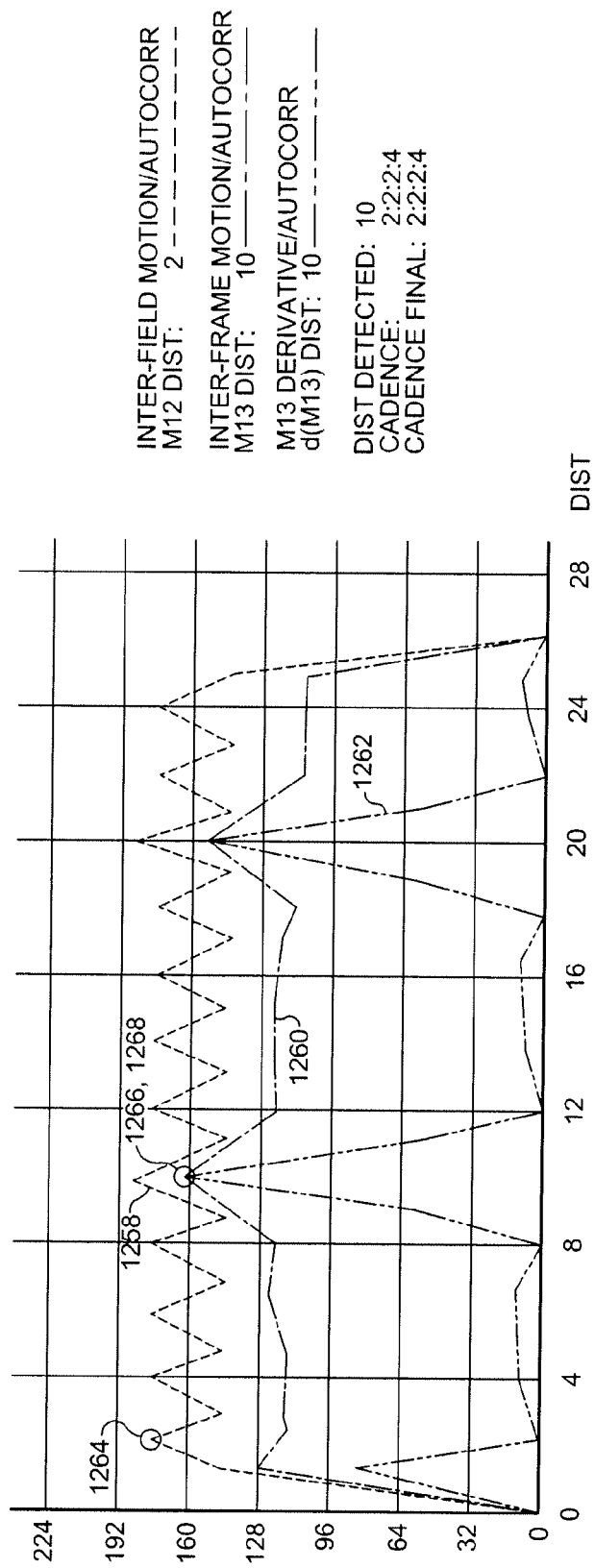

Referring now to FIG. 12(f) illustrating auto-correlation characteristics of the inter-field motion 1258, the inter-frame motion 1260 and the inter-frame motion dips 1262 for a 2:2:2:4 cadence listed in FIG. 9 are shown. The detected cadence length 221, 231, and 241 detected by cadence length detectors 220, 230, and 240 are indicated by circles 1264, 1266, and 1268, respectively. Based on these detected cadence lengths and the auto-correlation characteristics, the cadence length analyzer 250 and the auto-correlation analyzer 260 provide the detected cadence pattern 451.

Figure 12G:
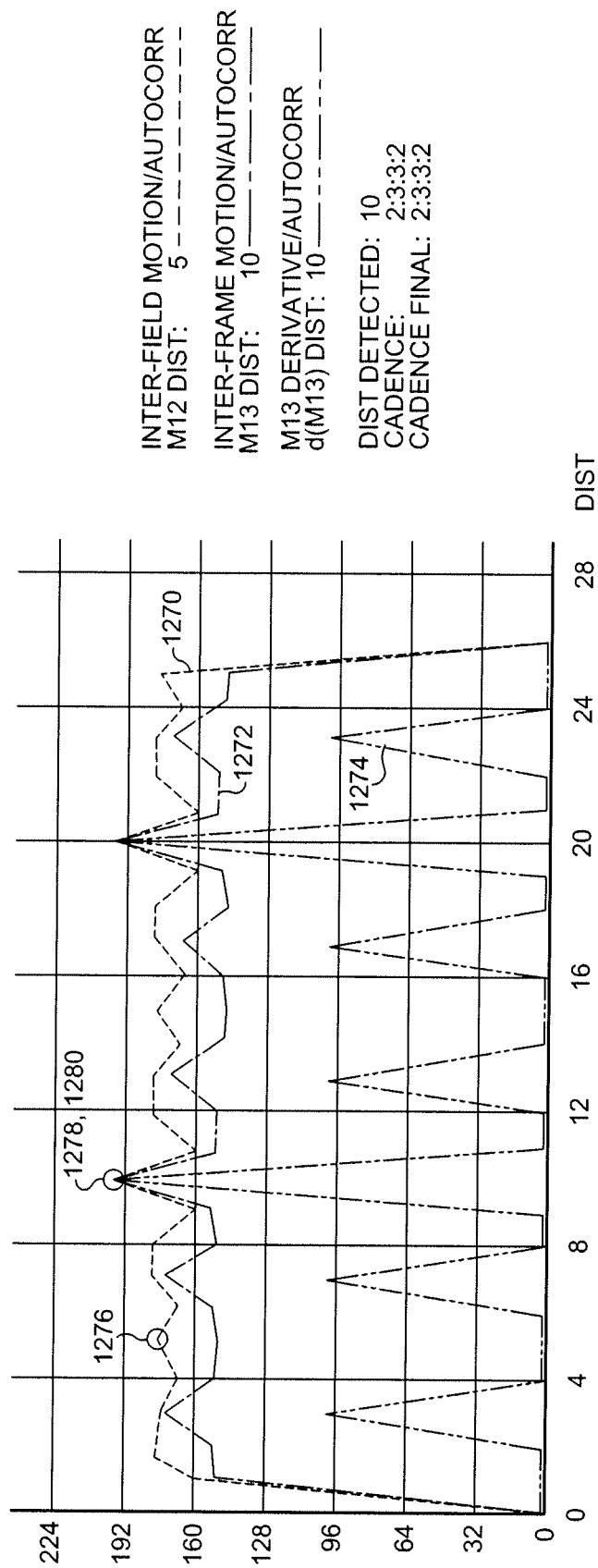

Referring now to FIG. 12(g) illustrating auto-correlation characteristics of the inter-field motion 1270, the inter-frame motion 1272, and the inter-frame motion dips 1274 for a 2:3:3:2 cadence listed in FIG. 9. The detected cadence length 221, 231, and 241 detected by 220, 230, and 240 are indicated by circles 1276, 1278, and 1280, respectively. Based on these detected cadence length and the auto-correlation characteristics, the cadence length analyzer 250 and the auto-correlation analyzer 260 provide the detected cadence pattern 451.

Figure 12H:
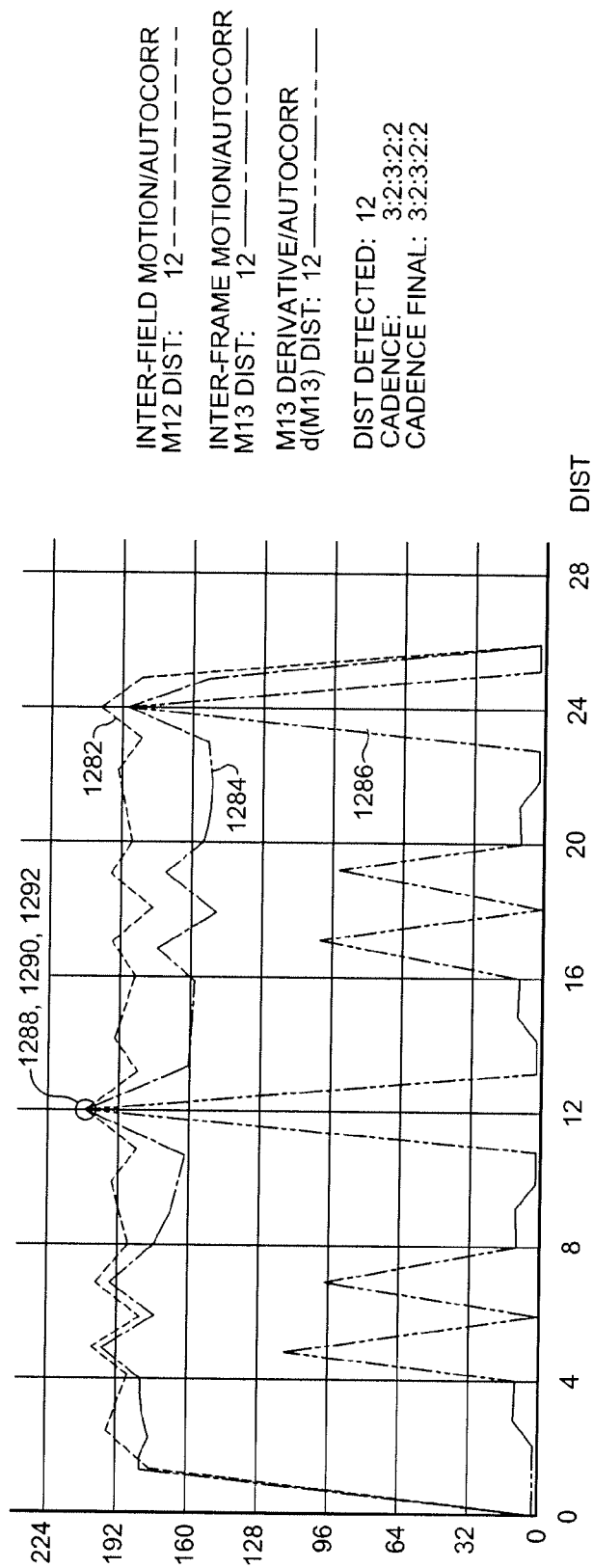

Referring now to FIG. 12(h) illustrating auto-correlation characteristics of the inter-field motion 1282, the inter-frame motion 1284 and the inter-frame motion dips 1286 for a 3:2:3:2:2 cadence listed in FIG. 9 are shown. The detected cadence length 221, 231, and 241 detected by cadence length detectors 220, 230, and 240 are indicated by circles 1288, 1290, and 1292, respectively. Based on these detected cadence lengths and the auto-correlation characteristics, the cadence length analyzer 250 and the auto-correlation analyzer 260 provide the detected cadence pattern 451.

Figure 12I:
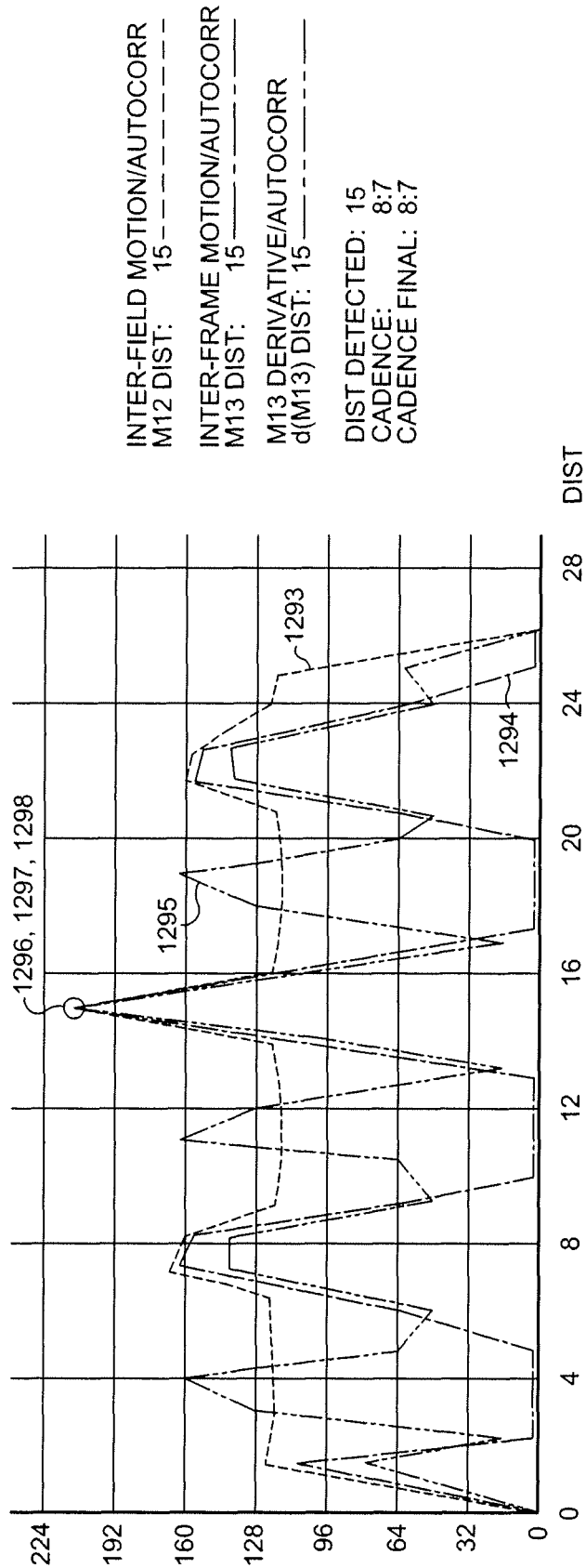

Referring now to FIG. 12(i) illustrating auto-correlation characteristics of the inter-field motion 1293, the inter-frame motion 1294 and the inter-frame motion dips 1295 for a 8:7 cadence listed in FIG. 9 are shown. The detected cadence length 221, 231, and 241 detected by cadence length detectors 220, 230, and 240 are indicated by circles 1296, 1297, and 1298, respectively. Based on these detected cadence lengths and the auto-correlation characteristics, the cadence length analyzer 250 and the auto-correlation analyzer 260 provide the detected cadence pattern 451.

Figure 12J:
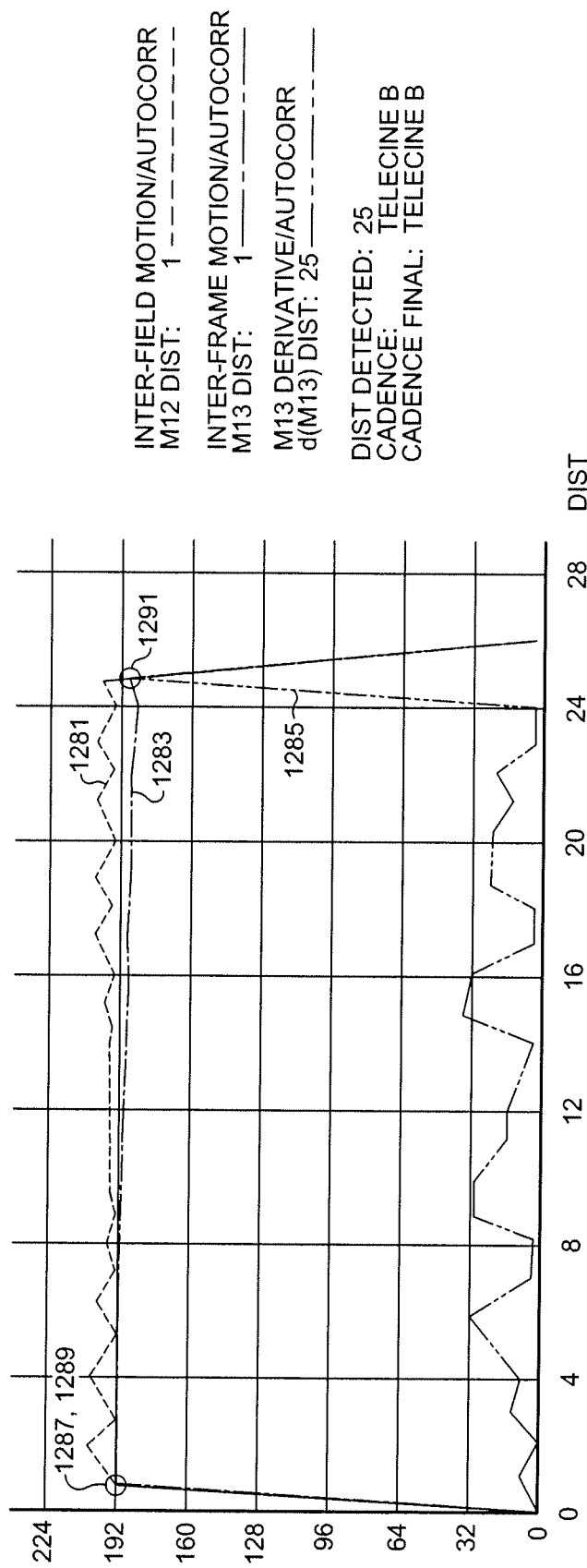

Referring now to FIG. 12(j) illustrating auto-correlation characteristics of the inter-field motion 1281, the inter-frame motion 1283, and the inter-frame motion dips 1285 for a Telecine B cadence listed in FIG. 9 are shown. The detected cadence length 221, 231, and 241 detected by cadence length detectors 220, 230, and 240 are indicated by circles 1287, 1289, and 1291, respectively. Based on these detected cadence lengths and the auto-correlation characteristics, the cadence length analyzer 250 and the auto-correlation analyzer 260 provide the detected cadence pattern 451.

FIG. 13 illustrates an exemplary diagram of a motion cross-correlation unit. Referring now to FIG. 13, a motion cross-correlation unit is generally depicted as reference number 300. In one embodiment, the motion cross-correlation unit 300 receives the array of average inter-field motions 161, the array of inter-frame motion dips 191, the cadence patterns LUT 400, and may provide the detected cadence phase 452 and an array of repeat field flags 453. In a preferred embodiment, the motion cross-correlation unit 300 also receives the reset signal 501 from the reset signal generator 500 and the phase break signal 561 from a phase break detector 560 for the initialization of the control parameters.

The motion cross-correlation unit 300 includes a cross-correlation parameter initialization unit 310, a normalized cross-correlation calculator 320, a peak detector 360, a repeat field flag generator 370, and an array buffer 380. The cross-correlation parameter initialization unit 310 is coupled to the normalized cross-correlation calculator 320 and the peak detector 360 is coupled to the normalized cross-correlation calculator 320. The repeat field flag generator 370 is coupled to the peak detector 360 and the array buffer 380.

In one embodiment, the cross-correlation parameter initialization unit 310 initializes the motion cross-correlation parameters to a set of pre-defined values and provides at least a cross-correlation input length $T_C$ 311. One of ordinary skill in the art would appreciate that each of the array buffers 156 and 176 would need to store at least $T_C$ number of motion values for the cross-correlation calculation.

In a preferred embodiment, the cross-correlation parameter initialization unit 310 receives a reset signal 501 from the reset signal generator 500 and the phase break signal 561 from the phase break detector 560, and resets at least the cross-correlation input length $T_C$ 311 according to the reset signal 501.

Figure 14:
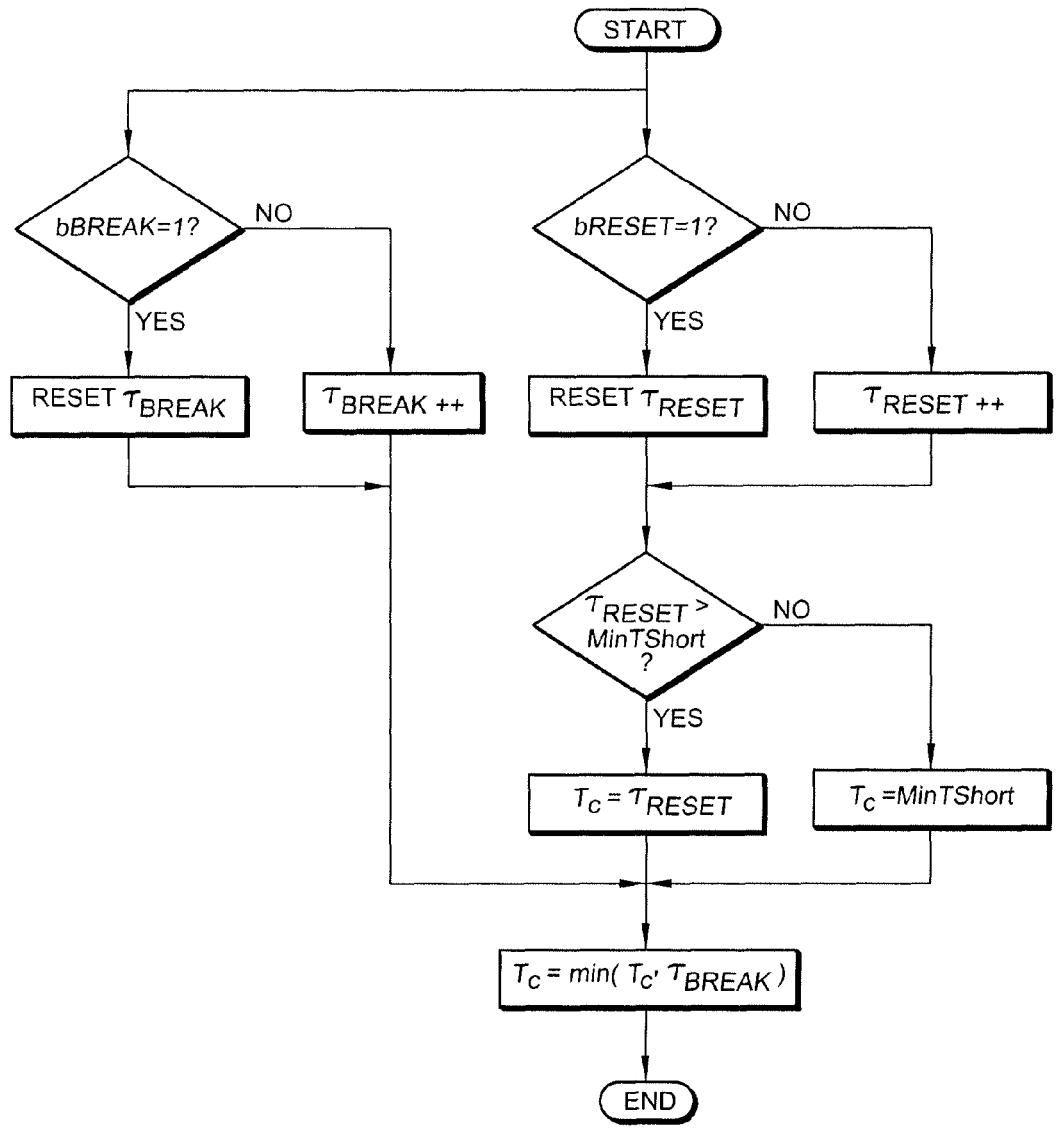
FIG. 14 illustrates an exemplary diagram of a cross-correlation parameter initialization method.

FIG. 14 illustrates an exemplary diagram of a cross-correlation parameter initialization method comprises steps of checking if the reset signal bReset is true, resetting the time after reset $\tau_{Reset}$ to '0' if yes, incrementing $\tau_{Reset}$ by '1' if no, checking if $\tau_{Reset}$ is larger than the minimum auto-correlation input length MinTShort, let the cross-correlation input length $T_C$ be the maximum of $\tau_{Reset}$ and MinTShort, checking if the phase break signal bBreak is true, resetting the time after the phase break $\tau_{Break}$ to '0' if yes, incrementing $\tau_{Break}$ by '1' if no, let the cross-correlation input length $T_C$ be $\tau_{Break}$ if $\tau_{Break}$ is smaller than itself. Referring now to FIGS. 13-14, the normalized cross-correlation calculator 320 receives the array of average inter-field motions 161 and the array of the inter-frame motion dips 191, the initialized parameters such as $T_C$ 311, the cadence patterns look-up-table 400, and provides the cross-correlation 321 to the peak detector 360. The normalized cross-correlation calculator 320 includes a cross-correlation calculator 330, a movement count unit 340, and a normalization unit 350. In operation, the cross-correlation calculator 330 receives the array of average inter-field motions $m_{12}(t)$, the array of average inter-frame motion dips $m_{13d}(t)$, where the time t∈[0, $T_C$], the cadence patterns $r_{12}$ and $r_{13d}$ from the look-up-table 400, and provides the cross-correlation $S(\rho)$.

Equation 4 illustrates the calculation of cross-correlation for a candidate phase ρ, where ρ∈[0, d), and d is the cadence length detected by the Motion Auto-Correlation Unit 200.

$$S(\rho) = \sum_{t=0}^{T_C-d} (m_{12}(t) \cdot r_{12}((t+\rho)\%L) + m_{13d}(t) \cdot r_{13d}((t+\rho)\%L)) \qquad \text{Equation 4}$$

The movement count unit 340 receives the cadence patterns 400 and provides the movement counts U(ρ) of the detected cadence at phase candidate ρ during the time from 0 to (T$_C$−d), as illustrated in Equation 5.

$$U(\rho) = \sum_{t=0}^{T_C-d} (r_{12}((t+\rho)\%L) + r_{13d}((t+\rho)\%L)) \qquad \text{Equation 5}$$

The normalization unit 350 receives the cross-correlation S(ρ), the movement counts U(ρ), and provides the normalized cross-correlation C(ρ), as illustrated in Equation 6.

$$C(\rho) = \frac{S(\rho)}{U(\rho)} \quad \rho \in [0, d) \qquad \text{Equation 6}$$

The peak detector 360 receives the normalized cross-correlation calculated by the normalized cross-correlation calculator 320, and provides the peak 452. Equation 7 explains the detection of the peak pidx, which is also the detected cadence phase.

$$pidx = \rho | C(\rho) = \max(C(\rho)) \qquad \text{Equation 7:}$$

The repeat field flag generator 370 receives the detected cadence phase 452, the cadence patterns LUT 400, and generates the flag '0' for non-repeat field and '1' for repeat field. The repeat field flags are then stored in an array buffer 380.

FIG. 15 illustrates an exemplary diagram of a reset signal generator.

Referring now to FIG. 15, a reset signal generator is generally depicted as reference number 500. The reset signal generator 500 includes a scene change detector 510, a cadence break detector 540, a phase break detector 560, three array buffer storage units 512, 542, 562, and a reset scenario analyzer 580. In one embodiment, the reset signal generator 500 receives the array of average inter-frame motions 131, the array of average inter-field motions 161, the detected cadence 451, phase 452, the array of repeat field flags 453, the cadence patterns LUT 400, and is configured to provide a reset signal 501 to the motion auto-correlation unit 200 and the motion cross-correlation unit 300.

FIGS. 16(*a*)-16(*d*) illustrate exemplary diagrams of reset signal generation scenarios. The x-axis of the diagrams is the field number or the time axis and the y-axis is the inter-field motions 161 after amplification of magnitude for clearer display. The diagrams also include an indication of scene change, phase break, and reset signal being generated. Each of the Figures represents a different scenario. More specifically, Scenario 1 is illustrated in FIG. 16(*a*), in this scenario a scene change and phase break happen together and the reset signal is generated.

FIGS. 16(*b*) and 16(*c*) illustrate Scenario 2, when scene change and cadence break/phase break happen together and the reset signal is generated. FIG. 16(*d*) illustrates Scenario 3, where a scene change happens alone without any cadence break or phase break and the reset signal is not generated. As shown, the reset signal is generated when a cadence break or phase break happens together with a scene change, which usually requires the cadence detector 200 and the phase detector 300 to reset as in FIG. 10 and FIG. 14, respectively, or else the motion auto-correlation and the motion cross-correlation analysis would be affected. Scene change alone without any cadence break or phase break would not trigger the generation of the reset signal, as the cadence and the phase after the scene change may continue just as before the scene change.

Figure 17:
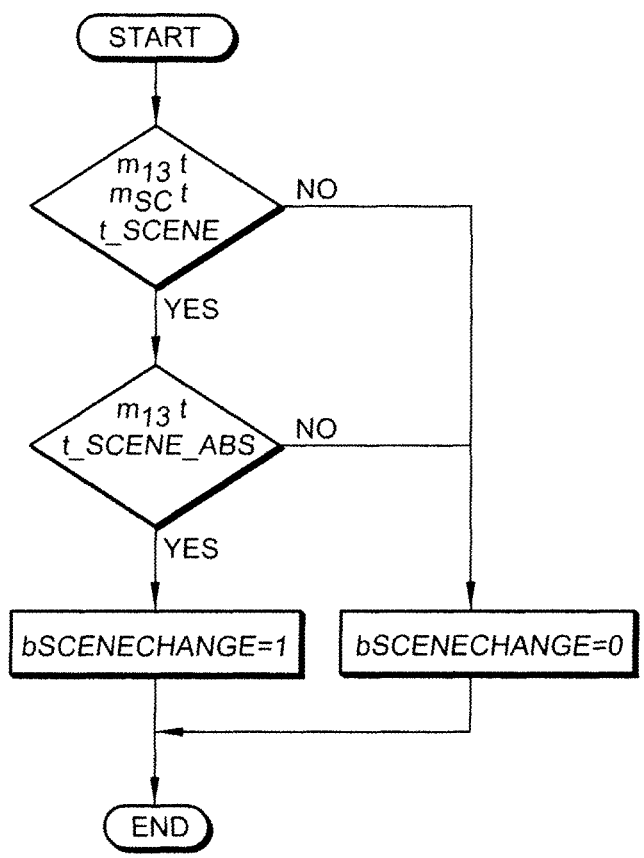
FIG. 17 illustrates an exemplary diagram of a scene change detection method.

FIG. 17 illustrates an exemplary diagram of a scene change detection method.

Referring now to FIG. 17, a flow diagram is generally illustrated; the method starts and is based on the received inter-frame motion signal m13 and the calculated scene motion msc, a scene change indicator bSceneChange is provided as shown in FIG. 17. The t_scene and t_scene_abs are two parameters to control the sensitivity of the scene change detection. Equation 8 describes the calculations of the scene motion m$_{sc}$ based on the inter-frame motion m$_{13}$ and the repeat field flags tbRepeat at time [0, T$_{sc}$1].

$$m_{sc}(t) = \frac{\sum_{i=0}^{T_{sc}-1} m_{13}(t-i) \cdot (!\,tbRpeat(t-i))}{\sum_{i=0}^{T_{sc}-1} (!\,tbRpeat(t-i))} \qquad \text{Equation 8}$$

Figure 18:
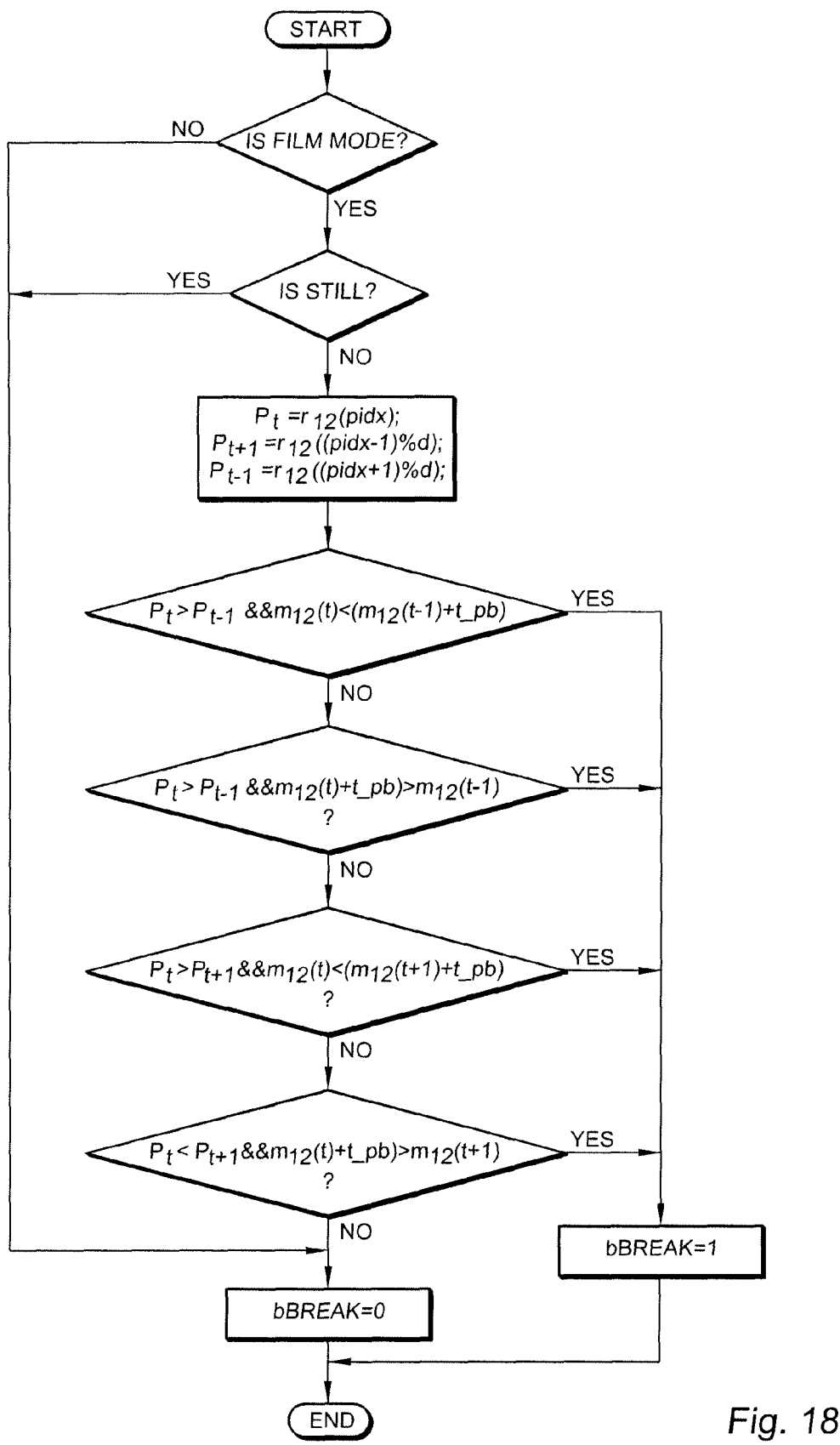
FIG. 18 illustrates an exemplary diagram of a phase break detection method.

FIG. 18 illustrates an exemplary diagram of a phase break detection method.

Referring now to FIG. 18, in this method, if film mode is detected and the picture is not still, the predicted phases of the previous, the current, and the next field, namely, p$_{t-1}$, p$_t$, and p$_{t+1}$ are obtained from the reference cadence patterns r$_{12}$ according to the detected cadence, the cadence length d, and the phase pidx. The high-low relationship of the inter-field motion m$_{12}$ of the previous, the current, and the next field are then compared to that of the predicted phases by a margin of t_pb. A phase break is detected if the inter-field motion behavior violates that of the predicted phases.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A film mode detecting apparatus, comprising:
   an inter-frame/field motion detector;
   a motion auto-correlation unit coupled to the inter-frame/field motion detector;
   a motion cross-correlation unit coupled to the motion auto-correlation unit; and
   a cadence pattern storage look-up-table coupled to the motion cross-correlation unit,
   wherein the motion auto-correlation unit comprises:
   an auto-correlation parameter initialization unit;
   a plurality of auto-correlation and cadence length detectors coupled to the auto-correlation parameter initialization unit;
   a cadence length analyzer coupled to the plurality of auto-correlation and cadence length detectors and a cadence patterns look-up-table; and
   an auto-correlation analyzer coupled to the cadence length analyzer, the plurality of auto-correlation and cadence length detectors, and the cadence patterns look-up-table.

2. The apparatus of claim 1, further comprising:
   a reset signal generator coupled to the motion auto-correlation unit.

3. The apparatus of claim 2, wherein the reset signal generator is configured to provide a reset signal to the motion auto-correlation unit and the motion cross-correlation unit.

4. The apparatus of claim 1, wherein the inter-frame/field motion detector comprises:
a pre-filter;
an inter-field motion detector;
an inter-frame motion detector; and
a repeat field detector.

5. The apparatus of claim 4, wherein the inter-frame/field motion detector comprises:
a plurality of field buffers;
a plurality of inter-frame motion detectors coupled to the plurality of field buffers having a plurality of outputs;
a max operator coupled to the plurality of outputs;
a field or block average unit; and
an array buffer to store the average inter-frame/field motion for a period of time.

6. The apparatus of claim 4, wherein the repeat field detector comprises:
a sum unit configured to receive a plurality of average inter-frame motion inputs at predetermined time intervals;
a first multiplier;
an adder;
a second multiplier coupled to the adder;
a comparator configured to compare the average inter-frame motion at a specific time to a predetermined threshold parameter;
a multiplexer configured to select the parameter kr or knr in accordance to the result of the comparator; and
an array buffer.

7. The apparatus of claim 1, wherein the auto-correlation parameter initialization unit is configured to receive the reset signal and provide a maximum detectable cadence length $\delta_{max}$, and an auto-correlation input length $T_A$.

8. The apparatus of claim 7, wherein the auto-correlation parameter initialization unit is configured to initialize the maximum detectable cadence length and the auto-correlation input length to support only conventional cadence detection when the time after the reset is less than a control parameter MinTLong, and support conventional and exotic cadence detection when the time after the reset is more than MinTLong.

9. The apparatus of claim 1, wherein the auto-correlation and cadence length detector comprises:
an auto-correlation calculator;
a peaks detector; and
a harmonics remover.

10. The apparatus of claim 1, wherein the motion cross-correlation unit comprises:
a cross-correlation parameter initialization unit;
a normalized cross-correlation calculator coupled to the cross-correlation parameter initialization unit and the cadence patterns look-up-table;
a peak detector coupled to the normalized cross-correlation calculator; and
a repeat field flag generator coupled to the peak detector and the cadence patterns look-up-table.

11. The apparatus of claim 10, wherein the cross-correlation parameter initialization unit is configured to receive the reset signal and a phase break signal and provide a cross-correlation input length $T_C$.

12. The apparatus of claim 10, wherein the normalized cross-correlation calculator comprises:
a cross-correlation calculator;
a normalization unit coupled to the cross-correlation calculator;
a movement count unit coupled to the normalization unit.

13. The apparatus of claim 2, wherein the reset signal generator comprises:
a scene change detector coupled to the inter-frame/field motion detector;
a cadence break detector;
a phase break detector coupled to the motion cross-correlation unit;
a cadence pattern look-up-table coupled to the phase break detector; and
a reset scenario analyzer coupled to the scene change detector, the cadence detector, and the phase break detector.

14. A cadence detection system for processing a sequence of video fields, comprising:
an inter-frame/field motion detector;
a motion auto-correlation unit coupled to the inter-frame/field motion detector;
a motion cross-correlation unit coupled to the motion auto-correlation unit;
a cadence pattern storage look-up-table coupled to the motion cross-correlation unit; and
a reset signal generator coupled to the motion auto-correlation unit configured to provide a reset signal based upon at least one of a scene change, cadence break, or phase break,
wherein the reset signal generator comprises:
a scene change detector coupled to the inter-frame/field motion detector;
a cadence break detector;
a phase break detector coupled to the motion cross-correlation unit;
a cadence pattern look-up-table coupled to the phase break detector; and
a reset scenario analyzer coupled to the scene change detector, the cadence detector, and the phase break detector.

15. The system of claim 14, wherein the reset scenario analyzer is configured to provide a reset signal when at least one of a cadence break or phase break occurs at substantially the same time as a scene change.

16. The system of claim 15, wherein the reset scenario analyzer is configured not to provide a reset signal when a scene change occurs without any cadence break or phase break.

17. The system of claim 14, wherein the inter-frame motion detector comprises:
a prefilter;
an inter-field motion detector;
a repeat field detector, wherein the repeat field detector comprises:
a sum unit configured to receive a plurality of average inter-frame motion inputs at predetermined time intervals;
a first multiplier;
an adder;
a second multiplier;
a comparator configured to compare the average inter-frame motion at a specific time to a predetermined threshold parameter;
a multiplexer configured to select a parameter kr or knr in accordance with a result of the comparator; and
an array buffer.

18. The system of claim 14, wherein the motion cross-correlation unit comprises:
a cross-correlation parameter initialization unit;
a normalized cross-correlation calculator coupled to the cross-correlation parameter initialization unit and the cadence patterns look-up-table;

a peak detector coupled to the normalized cross-correlation calculator; and a repeat field flag generator coupled to the peak detector and the cadence pattern look-up-table.

19. The system of claim 14, wherein the cadence pattern look-up-table comprises cadence patterns selected from the group consisting of 2:2 cadence, 3:2 cadence, 2:2:2:4 cadence, 2:3:3:2 cadence, 5:5 cadence, 6:4 cadence, 3:2:3:2:2 cadence, 8:7 cadence, and 2:2:2:2:2:2:2:2:2:2:3 cadence.

20. A method for detecting film mode, comprising:
receiving a video signal;
detecting a cadence by detecting the inter-frame/field motion and analyzing the motion auto-correlation;
determining a cadence phase by calculating the motion cross-correlation based on the detected cadence;
generating a reset signal with a reset generator; and
providing the reset signal to the motion auto-correlation detector and the motion cross-correlation unit,
wherein the reset generator is configured to generate a reset signal when a cadence break and/or phase break of the video signal occur at substantially the same time as the scene change signal.

21. The method of claim 20, wherein detecting a cadence by analyzing the auto-correlation comprises:
receiving a plurality of average motion inputs;
initializing the auto-correlation parameters;
calculating the auto-correlation and detecting the cadence length;
analyzing the cadence length with reference to a cadence patterns look-up-table;
analyzing the auto-correlation characteristics with reference to the cadence patterns look-up-table; and
providing the detected cadence based on the detected cadence length and the auto-correlation characteristics.

22. The method of claim 21, wherein calculating the auto-correlation and detecting the cadence length comprises:
calculating the auto-correlation of the average motion by using the equation $$A(\delta) = \sum_{t=0}^{T_A - \delta_{max}} m(t) \cdot m(t+\delta) \ \delta \in [2, \delta_{max}]$$

detecting the first and second highest peaks of the auto-correlation; and
removing the harmonics and providing the fundamental period as the final cadence length.

23. The method of claim 21, wherein removing the harmonics and providing the fundamental period as the final cadence length comprises:
initializing the cadence length variable $\delta$ to the minimum cadence length possible;
checking if $\delta$ is a fundamental period of $d_1$ and $d_2$; if yes checking if $A(n \times \delta)$ for all interger $n \in [1, \lfloor d_1/2 \rfloor]$ are local peaks eg. if $A(n \times \delta) > A(n \times \delta - 1)$ & $A(n \times \delta) > A(n \times \delta + 1)$ $\forall n \in [1, \lfloor d_1/2 \rfloor]$;
let the finally detected cadence length d be $\delta$ if yes, and increment $\delta$ by 1 if no and $$\delta \leq \frac{d_1}{2}.$$

24. The method of claim 21, wherein initializing the auto-correlation parameters comprises:
checking if the received reset signal bReset is true;
resetting the time after reset $\tau_{Reset}$ if yes, incrementing $\tau_{Reset}$ if no;
checking if $\tau_{Reset}$ is larger than the minimum auto-correlation input length MinTShort;
let the auto-correlation input length $T_A$ be the maximum of $\tau_{Reset}$ and MinTShort;
checking if $\tau_{Reset}$ is larger than the duration control for conventional cadence detection period after the reset; and
supporting exotic cadence if yes, else supporting only convention cadence.

25. The method of claim 20, wherein determining a cadence phase by calculating the motion cross-correlation comprises:
receiving a plurality of average inter-frame/field motions;
initializing cross-correlation parameters based on the reset signal and the phase break signal;
calculating the normalized cross-correlations; and
detecting the peak of the cross-correlation and providing the cadence phase.

26. The method of claim 21, wherein initializing cross-correlation parameters comprises:
checking if the received reset signal bReset is true;
resetting the time after reset $\tau_{Reset}$ to '0' if yes, incrementing $\tau_{Reset}$ by '1' if no;
checking if $\tau_{Reset}$ is larger than the minimum auto-correlation input length MinTShort;
let the cross-correlation input length $T_C$ be the maximum of $\tau_{Reset}$ and MinTShort;
checking if the phase break signal bBreak is true;
resetting the time after the phase break $\tau_{Break}$ to '0' if yes, incrementing $\tau_{Break}$ by '1' if no; and
let the cross-correlation input length $T_C$ be $\tau_{Break}$ if $\tau_{Break}$ is smaller than itself.

27. The method of claim 25, wherein calculating the normalized cross-correlation comprises:
calculating the cross-correlation between the average inter-frame/field motions and the cadence patterns by the equation $$S(\rho) = \sum_{t=0}^{T_C - d} (m_{12}(t) \cdot r_{12}((t+\rho)\%L) + m_{13d}(t) \cdot r_{13d}((t+\rho)\%L))$$

accumulating the movement bits in the cadence patterns by the equation $$U(\rho) = \sum_{t=0}^{T_C - d} (r_{12}((t+\rho)\%L) + r_{13d}((t+\rho)\%L))$$

normalizing the cross-correlation with the movement bits by the equation $$C(\rho) = \frac{S(\rho)}{U(\rho)} \ \rho \in [0, d).$$

* * * * *

UNITED STATES PATENT AND TRADEMARK OFFICE
CERTIFICATE OF CORRECTION

PATENT NO. : 8,537,901 B2  
APPLICATION NO. : 12/978154  
DATED : September 17, 2013  
INVENTOR(S) : Xiaoyun Deng and Lucas Hui Page 1 of 1

It is certified that error appears in the above-identified patent and that said Letters Patent is hereby corrected as shown below:

In the Claims

Column 15, line 58, Claim 23, "$[1 \lfloor d_1 / 2 \rfloor]$" should be --$[1, \lfloor d_1 / 2 \rfloor]$--

Signed and Sealed this  
Third Day of December, 2013

Margaret A. Focarino  
*Commissioner for Patents of the United States Patent and Trademark Office*